United States Patent
Fujii et al.

(10) Patent No.: US 10,161,507 B2
(45) Date of Patent: Dec. 25, 2018

(54) AUTOMATIC TRANSMISSION FOR VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Kota Fujii, Toyota (JP); Koichi Okuda, Toyota (JP); Atsushi Tabata, Okazaki (JP); Haruhisa Suzuki, Nagoya (JP); Tooru Matsubara, Toyota (JP); Kazuyuki Noda, Anjo (JP); Yoshimitsu Hyodo, Anjo (JP); Kousuke Tanaka, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 309 days.

(21) Appl. No.: 15/073,097

(22) Filed: Mar. 17, 2016

(65) Prior Publication Data
US 2016/0273650 A1 Sep. 22, 2016

(30) Foreign Application Priority Data

Mar. 20, 2015 (JP) .................................. 2015-058794

(51) Int. Cl.
*F16H 61/00* (2006.01)
*F16H 61/02* (2006.01)
(Continued)

(52) U.S. Cl.
CPC .......... *F16H 61/0265* (2013.01); *B60K 6/365* (2013.01); *B60K 6/383* (2013.01);
(Continued)

(58) Field of Classification Search
CPC ... B60K 6/383; F16H 61/18; F16H 2061/165; F16H 61/0021; F16H 61/16
See application file for complete search history.

(56) References Cited

U.S. PATENT DOCUMENTS 6,494,801 B1  12/2002  Ohtake et al.
2011/0077124 A1*  3/2011  Moorman ........... F16H 61/0021
                                                              477/152

FOREIGN PATENT DOCUMENTS

JP    2001-105909 A    4/2001
JP    2001-108081 A    4/2001
(Continued)

*Primary Examiner* — William Kelleher
*Assistant Examiner* — Gregory T Prather
(74) *Attorney, Agent, or Firm* — Oliff PLC

(57) ABSTRACT

In a non-forward range, the same gear position as a forward first gear position is established in a stepped transmission. A hydraulic controller includes a second linear solenoid valve and third linear solenoid valve that respectively supply hydraulic pressure to a second clutch and first brake, and a selector valve that is provided in an oil passage upstream of the second and third linear solenoid valves and that switches between a state where hydraulic pressure is supplied to the oil passage and a state where supply of hydraulic pressure is cut off. When the non-forward range is set or when a vehicle is moving backward, the selector valve cuts off supply of hydraulic pressure to the oil passage. Thus, when there is a failure in the second or third linear solenoid valve, it is possible to suitably establish a gear position wherein the vehicle is not allowed to move backward.

30 Claims, 12 Drawing Sheets

(51) Int. Cl.
  *B60K 6/547* (2007.10)
  *F16H 61/16* (2006.01)
  *B60K 6/365* (2007.10)
  *B60K 6/383* (2007.10)
  *B60K 6/387* (2007.10)
  *B60K 6/445* (2007.10)
  *F16H 3/72* (2006.01)
  *F16H 59/10* (2006.01)
  *F16H 61/12* (2010.01)
  *B60K 6/38* (2007.10)
  *F16H 3/66* (2006.01)
  *F16H 3/44* (2006.01)

(52) U.S. Cl.
  CPC ............ *B60K 6/387* (2013.01); *B60K 6/445* (2013.01); *B60K 6/547* (2013.01); *F16H 3/728* (2013.01); *F16H 59/105* (2013.01); *F16H 61/0021* (2013.01); *F16H 61/12* (2013.01); *F16H 61/16* (2013.01); *B60K 2006/381* (2013.01); *B60Y 2200/92* (2013.01); *B60Y 2400/406* (2013.01); *B60Y 2400/70* (2013.01); *F16H 3/66* (2013.01); *F16H 2003/445* (2013.01); *F16H 2061/1252* (2013.01); *F16H 2200/0043* (2013.01); *F16H 2200/2007* (2013.01); *F16H 2200/2041* (2013.01); *F16H 2200/2066* (2013.01); *F16H 2200/2082* (2013.01); *Y02T 10/6239* (2013.01); *Y10S 903/919* (2013.01)

(56) References Cited

FOREIGN PATENT DOCUMENTS

| | | |
|---|---|---|
| JP | 2006-029439 A | 2/2006 |
| JP | 2007-290630 A | 11/2007 |
| JP | 2012-224289 A | 11/2012 |
| JP | 2014-020441 A | 2/2014 |

\* cited by examiner

FIG. 5

|   |   | ENGAGEMENT DEVICE ||||| SOLENOID PATTERN ||||||
|---|---|---|---|---|---|---|---|---|---|---|---|---|
|   |   | C1 | C2 | B1 | B2 | F1 | SL1 | SL2 | SL3 | SL4 | SC1 | SC2 |
| P | 1st | ○ |  |  | ○ |  | ○ |  |  | ○ | ○ | ○ |
| R | 1st | ○ |  |  | ○ |  | ○ |  |  | ○ | ○ | ○ |
| N | FORWARD 1st | ○ |  |  | ○ |  | ○ |  |  | ○ | ○ |  |
|   | REVERSE 1st | ○ |  |  | ○ |  | ○ |  |  | ○ | ○ | ○ |
| D | 1st | ○ |  |  | ○ | ○ | ○ |  |  | ○ | ○ |  |
|   | 2nd | ○ |  | ○ |  |  | ○ |  | ○ |  | ○ |  |
|   | 3rd | ○ | ○ |  |  |  | ○ | ○ |  |  | ○ |  |
|   | 4th |  | ○ | ○ |  |  |  | ○ | ○ |  | ○ |  |

FIG. 10

| RANGE | FIRST TRANSMISSION | SECOND TRANSMISSION | | | | |
|---|---|---|---|---|---|---|
| | ROTATING MACHINE | GEAR POSITION | C1 | C2 | B1 | B2 |
| P | NEUTRAL | 1st | ○ | | | ○ |
| R | REVERSE ROTATION | 1st | ○ | | | ○ |
| N | NEUTRAL | 1st | ○ | | | ○ |
| D | FORWARD ROTATION | 1st | ○ | | | ○ |

AUTOMATIC TRANSMISSION FOR VEHICLE

INCORPORATION BY REFERENCE

The disclosure of Japanese Patent Application No. 2015-058794 filed on Mar. 20, 2015 including the specification, drawings and abstract is incorporated herein by reference in its entirety.

BACKGROUND

1. Field

The disclosure relates to an automatic transmission for a vehicle and, more particularly, to improvement for preventing or reducing shock in the event of a failure of an electromagnetic valve.

2. Description of Related Art

A known automatic transmission for a vehicle includes a rotating machine and a stepped transmission. In the automatic transmission, the rotating machine and the stepped transmission are provided in series with each other in a power transmission path between a drive source and wheels. There has been suggested the following technique intended for such an automatic transmission for a vehicle. The same combination of engaged or released states of engagement elements in the stepped transmission is used for both a predetermined gear position in a forward range and a gear position in a reverse range, and then a shift change is performed by rotating the rotating machine in the forward direction or rotating the rotating machine in the reverse direction. For example, a controller for a hybrid vehicle, described in Japanese Patent Application Publication No. 2012-224289 (JP 2012-224289 A), is an example of the above-described technique.

SUMMARY

Incidentally, in the above-described existing technique, the stepped transmission includes a one-way clutch. In gear positions higher than or equal to a second gear position (2nd) in the forward range, that is, in gear positions other than a first gear position (1st), the reverse rotation of an output shaft, that is, the rotation of the output shaft in a vehicle reverse direction, is disabled by engagement of the one-way clutch. However, in the existing technique, when there occurs a failure in an electromagnetic valve that controls hydraulic pressure that is supplied to the stepped transmission and, as a result, a gear position higher than or equal to the second gear position is established while the vehicle is moving backward, the stepped transmission enters a locked state to generate braking force because of the disabled reverse rotation of the output shaft. That is, shock occurs due to rapid deceleration of the vehicle. The above-described inconvenience was newly found in process in which the inventors had been continuing a diligent study with the intention to improve the performance of an automatic transmission for a vehicle.

The disclosure provides an automatic transmission for a vehicle, which prevents or reduces shock in the event of a failure of the electromagnetic valve.

An aspect of the disclosure provides an automatic transmission for a vehicle. The automatic transmission includes: a rotating machine; a stepped transmission, the rotating machine and the stepped transmission being provided in series with each other in a power transmission path between a drive source and a wheel, a gear position in which the vehicle is allowed to move backward or a gear position in which the vehicle is not allowed to move backward being established in the stepped transmission in a forward range, the same gear position as the gear position in which the vehicle is allowed to move backward being established in the stepped transmission in a non-forward range; and a hydraulic controller configured to control hydraulic pressure that is supplied to the stepped transmission, the hydraulic controller including an electromagnetic valve and an oil passage switching device, the electromagnetic valve being configured to supply hydraulic pressure to an engagement element for establishing the gear position in which the vehicle is not allowed to move backward in the stepped transmission, the oil passage switching device being provided in an oil passage upstream of the electromagnetic valve, the oil passage switching device being configured to switch between a state where hydraulic pressure is supplied to the oil passage and a state where supply of hydraulic pressure is cut off, the oil passage switching device being configured to, when the non-forward range is set or when the vehicle is moving backward, cut off supply of hydraulic pressure to the oil passage.

According to the above aspect, the gear position in which the vehicle is allowed to move backward or the gear position in which the vehicle is not allowed to move backward is established in the stepped transmission in the forward range, and the same gear position as the gear position in which the vehicle is allowed to move backward is established in the stepped transmission in the non-forward range. The hydraulic controller configured to control hydraulic pressure that is supplied to the stepped transmission is provided. The hydraulic controller includes the electromagnetic valve and the oil passage switching device. The electromagnetic valve is configured to supply hydraulic pressure to the engagement element for establishing the gear position in which the vehicle is not allowed to move backward in the stepped transmission. The oil passage switching device is provided in the oil passage upstream of the electromagnetic valve. The oil passage switching device is configured to switch between the state where hydraulic pressure is supplied to the oil passage and the state where supply of hydraulic pressure is cut off. The oil passage switching device is configured to, when the non-forward range is set or when the vehicle is moving backward, cut off supply of hydraulic pressure to the oil passage. Thus, when there is a failure in the electromagnetic valve, it is possible to prevent supply of hydraulic pressure to the engagement element, so it is possible to suitably prevent the gear position in which the vehicle is not allowed to move backward from being established. That is, it is possible to provide the automatic transmission for a vehicle, which prevents or reduces shock in the event of a failure of the electromagnetic valve.

In the above aspect, the non-forward range may be a reverse range, and the oil passage switching device may be configured to, when the reverse range is set, cut off supply of hydraulic pressure to the oil passage. With this configuration, it is possible to suitably prevent the gear position in which the vehicle is not allowed to move backward from being established in the reverse range, so it is possible to prevent or reduce shock in the event of a failure of the electromagnetic valve.

In the above aspect, the non-forward range may be a parking range, and the oil passage switching device may be configured to, when the parking range is set, cut off supply of hydraulic pressure to the oil passage. With this configuration, by establishing a predetermined gear position in the parking range, it is possible to shorten a hydraulic pressure supply time at the time of operation to change from the parking range to another range, so it is possible to improve the response at the time of, for example, a garage shift.

In the above aspect, the non-forward range may be a neutral range, and the oil passage switching device may be configured to, when the neutral range is set and the vehicle is moving backward, cut off supply of hydraulic pressure to the oil passage. With this configuration, when the vehicle moves backward in the neutral range, it is possible to suitably prevent the gear position in which the vehicle is not allowed to move backward from being established, so it is possible to prevent or reduce shock in the event of a failure of the electromagnetic valve.

In the above aspect, the oil passage switching device may be configured to, when the forward range is set and the vehicle is moving backward, cut off supply of hydraulic pressure to the oil passage. With this configuration, when the vehicle moves backward in the forward range, it is possible to suitably prevent the gear position in which the vehicle is not allowed to move backward from being established, so it is possible to prevent or reduce shock in the event of a failure of the electromagnetic valve.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is an operation chart that shows both a combination of operations of engagement elements that are used to establish each gear position and a combination of solenoid patterns in each gear position in the stepped transmission provided in the automatic transmission for a vehicle, shown in FIG. 1;

FIG. 10 is a chart that conceptually shows that the neutral, forward or reverse of the overall automatic transmission is established in response to the state of a power split mechanism and the state of the stepped transmission in the automatic transmission for a vehicle, shown in FIG. 1;

DETAILED DESCRIPTION OF EMBODIMENTS

Figure 1:
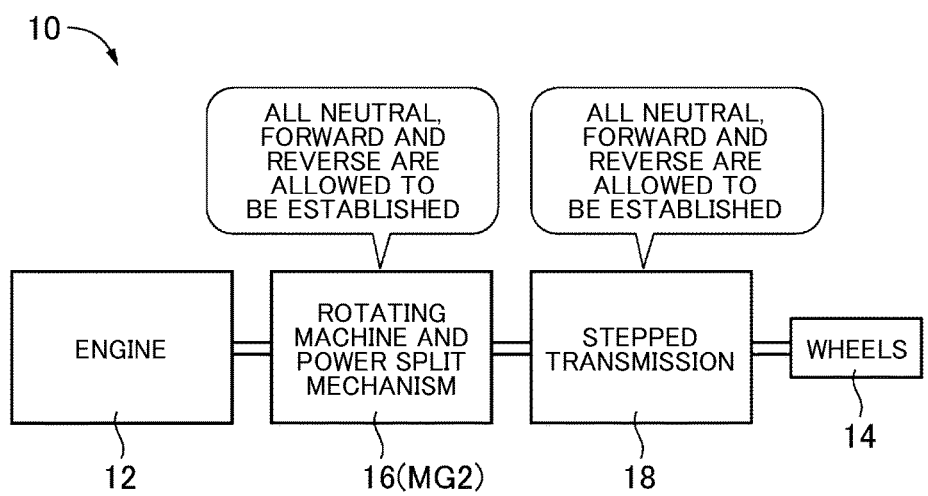
FIG. 1 is a view that schematically shows the configuration of an automatic transmission for a vehicle, to which the disclosure is suitably applied.

The stepped transmission is suitably a stepped automatic transmission that includes a plurality of hydraulic friction engagement devices and that selectively establishes any one of a plurality of gear positions in response to a combination of engaged or released states of those hydraulic friction engagement devices.

The gear position in which the vehicle is allowed to move backward is suitably a first gear position, that is, a gear position having the largest speed ratio, in the stepped transmission. The gear position in which the vehicle is not allowed to move backward is suitably a gear position higher than or equal to a second gear position, that is, a gear position having a smaller speed ratio than the first gear position, in the stepped transmission.

The stepped transmission suitably includes a one-way clutch that is provided between a rotating element and a non-rotating member in the stepped transmission and that permits rotation of the rotating element in one direction with respect to the non-rotating member and that blocks rotation of the rotating element in the reverse direction. Suitably, in the gear position in which the vehicle is allowed to move backward, the one-way clutch is allowed to be engaged. In the gear position in which the vehicle is not allowed to move backward, the stepped transmission locks when the one-way clutch is engaged.

The rotating machine is suitably an electric motor that at least includes the function of a motor that outputs driving force as a drive source for propelling the vehicle. More suitably, the rotating machine is a motor generator that functions as a motor and a generator.

The automatic transmission for a vehicle suitably includes a first electric motor and a second electric motor that serves as the rotating machine. Suitably, the automatic transmission further includes a differential unit that is provided in a power transmission path between the drive source and the stepped transmission and that includes a first rotating element coupled to the first electric motor, a second rotating element coupled to the drive source, and a third rotating element coupled to a transmission member. Suitably, the second electric motor is coupled to the transmission member.

Hereinafter, an embodiment of the disclosure will be described in detail with reference to the accompanying drawings. In the drawings that are used in the following description, the scale ratio, and the like, of each portion are not always accurately drawn.

FIG. 1 is a view that schematically shows the configuration of an automatic transmission 10 for a vehicle (hereinafter, simply referred to as automatic transmission 10) to which the disclosure is suitably applied. The automatic transmission 10 according to the present embodiment is suitably used in a front-engine rear-drive (FR) vehicle in which the automatic transmission 10 is longitudinally arranged. As shown in FIG. 1, the automatic transmission 10 includes a power split mechanism 16 and a stepped transmission 18. The power split mechanism 16 includes a rotating machine. The power split mechanism 16 and the stepped transmission 18 are provided in series with each other in a power transmission path between an engine 12 and wheels 14. The engine 12 is a drive source. The wheels 14 are drive wheels. The automatic transmission 10 transmits driving force generated by the engine 12 to the wheels 14 via the power split mechanism 16, the stepped transmission 18, a differential gear unit (not shown), axles (not shown), and the like. The engine 12 serves as a drive source for propelling the vehicle. The power split mechanism 16 serves as a first transmission. The stepped transmission 18 serves as a second transmission.

Figure 2:
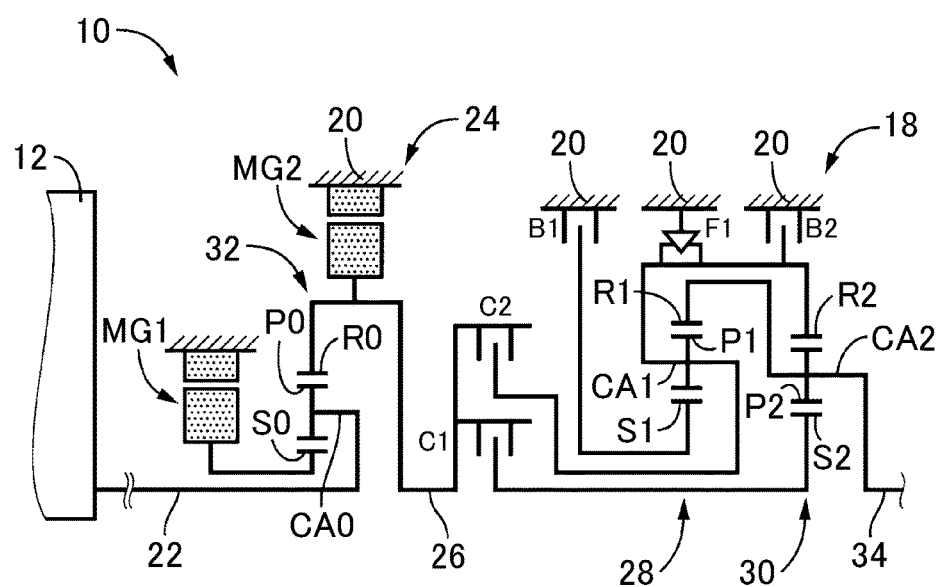
FIG. 2 is a skeletal view that illustrates the specific configuration of the automatic transmission for a vehicle, shown in FIG. 1.

FIG. 2 is a skeletal view that illustrates the schematic configuration of the automatic transmission 10. As shown in FIG. 2, the automatic transmission 10 according to the present embodiment includes an input shaft 22, a differential unit 24, the stepped transmission 18 and an output shaft 34 inside a transmission case 20 (hereinafter, referred to as case 20) in series along the common axis. The case 20 serves as a non-rotating member and is connected to a vehicle body. The differential unit 24 is coupled to the input shaft 22 directly or indirectly via a pulsation absorbing damper (vibration damping device) (not shown), or the like. The stepped transmission 18 is serially coupled to a power transmission path between the differential unit 24 and the pair of wheels 14 via the transmission member (transmission shaft) 26. The output shaft 34 is coupled to the stepped transmission 18.

The engine 12 is an internal combustion engine, such as a gasoline engine and a diesel engine, and is directly coupled to the input shaft 22 or indirectly coupled to the input shaft via a pulsation absorbing damper (not shown). In the automatic transmission 10 according to the present embodiment, the engine 12 and the differential unit 24 are directly coupled to each other. This direct coupling means coupling without intervening a fluid transmission device, such as a torque converter and a fluid coupling. For example, coupling via the pulsation absorbing damper, or the like, is included in this direct coupling. The automatic transmission 10 is symmetric with respect to the axis thereof. Therefore, in the skeletal view of FIG. 2, the lower half is not shown. The same applies to the following embodiments.

The differential unit 24 includes a first electric motor MG1, a power split device 32 and a second electric motor MG2. The power split device 32 is a mechanical mechanism that mechanically distributes the output power of the engine 12, input to the input shaft 22. The power split device 32 serves as a differential mechanism that distributes the output power of the engine 12 to the first electric motor MG1 and the transmission member 26. The second electric motor MG2 is operably coupled to the transmission member 26 so as to rotate integrally with the transmission member 26. The first electric motor MG1 and the second electric motor MG2, which are provided in the automatic transmission 10 according to the present embodiment, each are suitably a so-called motor generator that functions as a motor and a generator. The first electric motor MG1 includes at least a generator function for generating reaction force. The second electric motor MG2 includes at least a motor function for outputting driving force as a drive source for propelling the vehicle. With the above configuration, the differential unit 24 functions as an electric differential unit in which a differential state between an input rotation speed (the rotation speed of the input shaft 22) and an output rotation speed (the rotation speed of the transmission member 26) is controlled by controlling the operating state of the differential unit 24 via the first electric motor MG1 and the second electric motor MG2. In the present embodiment, the second electric motor MG2 corresponds to the rotating machine. The differential unit 24 corresponds to the power split mechanism 16 including the second electric motor MG2 as the rotating machine. FIG. 1 illustrates the configuration that the second electric motor MG2 is coupled to the transmission member 26. Instead, the second electric motor MG2 may be coupled to any rotating element in a power transmission path downstream (that is, on the wheels 14 side) of the transmission member 26.

The power split device 32 is mainly formed of a single pinion planetary gear set. The planetary gear set includes a sun gear S0, planetary gears P0, a carrier CA0 and a ring gear R0 as rotating elements (elements). The carrier CA0 supports the planetary gears P0 such that each planetary gear P0 is rotatable and revolvable. The ring gear R0 is in mesh with the sun gear S0 via the planetary gears P0. The carrier CA0 is coupled to the input shaft 22, that is, the engine 12. The sun gear S0 is coupled to the first electric motor MG1. The ring gear R0 is coupled to the transmission member 26. In the power split device 32, the carrier C0 functions as an input element, the sun gear S0 functions as a reaction element, and the ring gear R0 functions as an output element.

In the thus configured power split device 32, the differential state is set. The differential state is a state where the sun gear S0, the carrier CA0 and the ring gear R0 each are relatively rotatable with respect to one another, and a differential action is operable, that is, the differential action works. For this reason, the output power of the engine 12 is distributed to the first electric motor MG1 and the transmission member 26, and electric power is stored or the second electric motor MG2 is driven to rotate by using electric energy generated from the first electric motor MG1 with the use of part of the distributed output power of the engine 12. Therefore, the differential unit 24 (power split mechanism 16) is caused to function as the electric differential device, with the result that a so-called continuously variable transmission state (electric CVT state) is achieved. Thus, the rotation of the transmission member 26 is continuously varied irrespective of the rotation of the engine 12. That is, the differential unit 24 functions as an electric continuously variable transmission mechanism of which the speed ratio γ0 (Rotation speed NIN of the input shaft 22/Rotation speed N26 of the transmission member 26) is continuously varied from a minimum value γ0min to a maximum value γ0max. In this way, through control over the operating states of the first electric motor MG1, second electric motor MG2 and engine 12 that are coupled to the power split device 32 such that power is transmittable, the differential unit 24 is operated as a continuously variable transmission mechanism by which the differential state between the rotation speed of the input shaft 22 and the rotation speed of the transmission member 26 that functions as the output shaft of the differential unit 24 is controlled.

In the automatic transmission 10, an EV mode (EV drive mode), an engine mode (engine drive mode), an HV mode (hybrid drive mode), or the like, is selectively established. In EV mode, the engine 12 is stopped, and at least one of the first electric motor MG1 and the second electric motor MG2 (suitably, the second electric motor MG2) is used as a drive source for propelling the vehicle. In engine mode, the engine 12 is driven to be used as a drive source for propelling the vehicle, and the first electric motor MG1 and the second electric motor MG2 are caused to rotate at idle or caused to perform regeneration. In HV mode, the engine 12 and the second electric motor MG2 are used as drive sources for propelling the vehicle, and regeneration is performed by the first electric motor MG1 where necessary.

The stepped transmission 18 is a planetary gear multistage transmission mechanism mainly formed of single pinion planetary gear sets 28, 30, and functions as a stepped automatic transmission. The planetary gear set 28 includes a sun gear S1, planetary gears P1, a carrier CA1 and a ring gear R1. The carrier CA1 supports the planetary gears P1 such that each planetary gear P1 is rotatable and revolvable. The ring gear R1 is in mesh with the sun gear S1 via the planetary gears P1. The planetary gear set 30 includes a sun gear S2, planetary gears P2, a carrier CA2 and a ring gear R2. The carrier CA2 supports the planetary gears P2 such that each planetary gear P2 is rotatable and revolvable. The ring gear R2 is in mesh with the sun gear S2 via the planetary gears P2.

The stepped transmission 18 includes a plurality of engagement elements, and selectively establishes any one of a plurality of gear positions in response to a combination of engaged or released states of those engagement elements. For example, the stepped transmission 18 includes a first clutch C1, a second clutch C2, a first brake B and a second brake B2 (hereinafter, referred to as clutches C and brakes B when not specifically distinguished from each other) that are hydraulic friction engagement devices as the engagement elements. The clutches C and the brakes B are hydraulic friction engagement devices that are often used in an existing automatic transmission for a vehicle. Each of the clutches C and the brakes B is a wet multiple disc type, a band brake, or the like. In the wet multiple disc type, mutually stacked multiple friction plates are pressed by a hydraulic actuator. In the band brake, one end of one or two bands wound around the outer periphery of a rotating drum is tightened by a hydraulic actuator. Each of the clutches C and the brakes B is used to selectively couple members on both sides of each of the clutches C and the brakes B.

As shown in FIG. 2, in the stepped transmission 18, the sun gear S1 is selectively coupled to the case 20 via the first brake B1. The carrier CA1 and the ring gear R2 are integrally coupled to each other, and are selectively coupled to the case 20 via the second brake B2. The stepped transmission 18 includes a one-way clutch F1 between the integrally coupled carrier CA1 and ring gear R2 and the case 20. The one-way clutch F1 permits the rotation of the carrier CA1 and ring gear R2 in one direction with respect to the case 20, and blocks the rotation of the carrier CA1 and ring gear R2 in the reverse direction with respect to the case 20. When the output shaft 34 is being rotated in a direction corresponding to a vehicle reverse direction, the one-way clutch F1 is engaged (locked), and the rotation of the carrier CA1 and ring gear R2 with respect to the case 20 is blocked. The sun gear S2 is selectively coupled to the transmission member 26 via the first clutch C1. The integrally coupled carrier CA1 and ring gear R2 are selectively coupled to the transmission member 26 via the second clutch C2. The ring gear R1 and the carrier CA2 are integrally coupled to each other, and are coupled to the output shaft 34.

Figure 3:
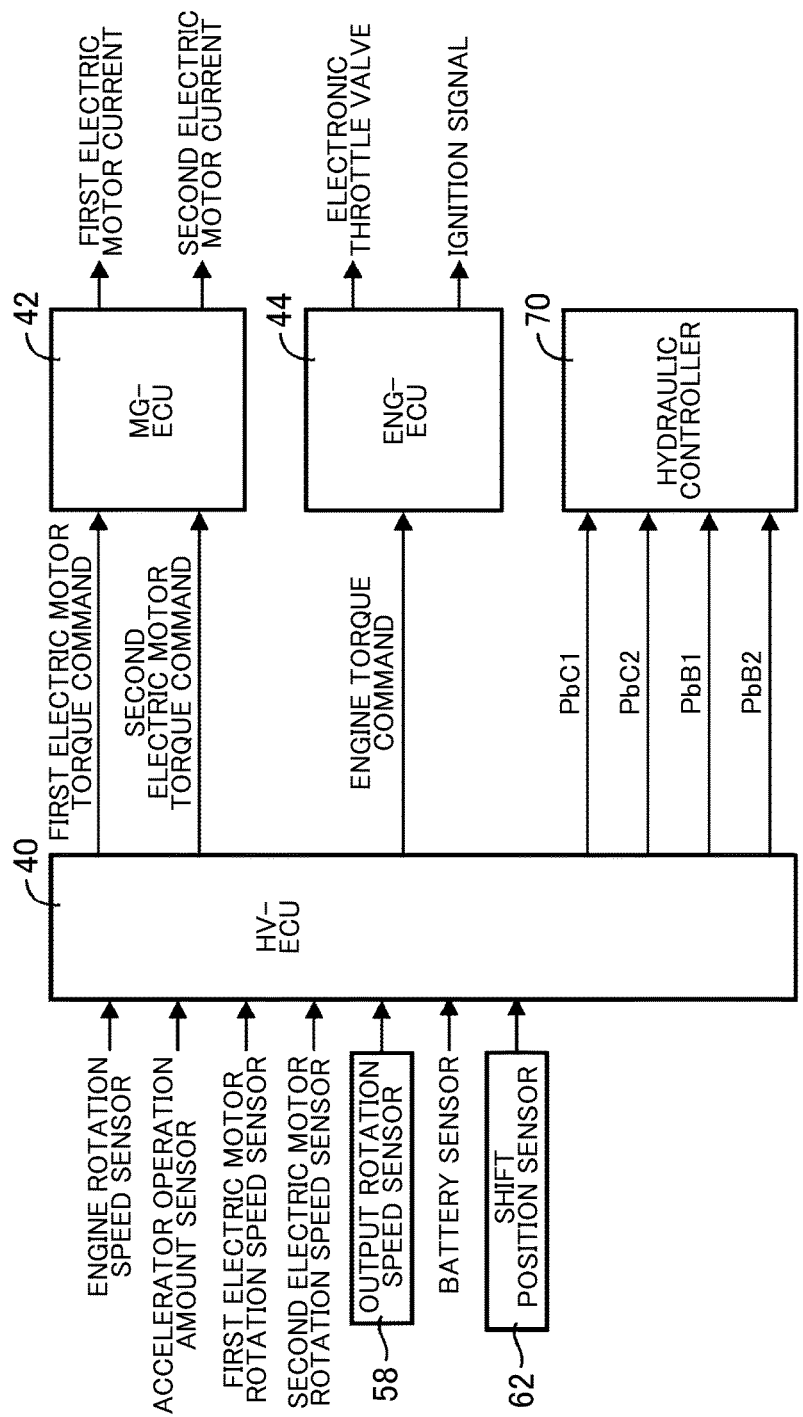
FIG. 3 is a view that schematically shows the configuration of a control system provided in the automatic transmission for a vehicle, shown in FIG. 1.

FIG. 3 is a view that schematically shows the configuration of a control system provided in the automatic transmission 10. As shown in FIG. 3, the automatic transmission 10 includes an HV-ECU 40 that serves as a hybrid drive controller, an MG-ECU 42 that serves as an electric motor controller, and an ENG-ECU 44 that serves as an engine controller. Each of the HV-ECU 40, the MG-ECU 42 and the ENG-ECU 44 includes a so-called microcomputer including a CPU, a ROM, a RAM, input/output interfaces, and the like, and executes various controls associated with the automatic transmission 10 by executing signal processing in accordance with a program prestored in the ROM while utilizing the temporary storage function of the RAM.

Various signals indicating the states of portions in the automatic transmission 10 are supplied to the HV-ECU 40 from sensors, switches, and the like, provided in the automatic transmission 10. The various signals include, for example, a signal indicating an output rotation speed NOUT from an output rotation speed sensor 58, a signal indicating a shift position (shift operating position) PSH from a shift position sensor 62, and the like. The output rotation speed NOUT is the rotation speed of the output shaft 34, and corresponds to a vehicle speed V. The shift position PSH corresponds to the operating position of a shift lever 38 in a shift operating device 36 (described later). Operation commands are output from the HV-ECU 40 to portions in the automatic transmission 10. For example, a first clutch engagement pressure command PbC1, a second clutch engagement pressure command PbC2, a first brake engagement pressure command PbB1, a second brake engagement pressure command PbB2, and the like, are output to a hydraulic controller 70 (described later) provided in the automatic transmission 10. The first clutch engagement pressure command PbC1 is used for engagement control over the first clutch C1. The second clutch engagement pressure command PbC2 is used for engagement control over the second clutch C2. The first brake engagement pressure command PbB1 is used for engagement control over the first brake B1. The second brake engagement pressure command PbB2 is used for engagement control over the second brake B2.

Figure 4:
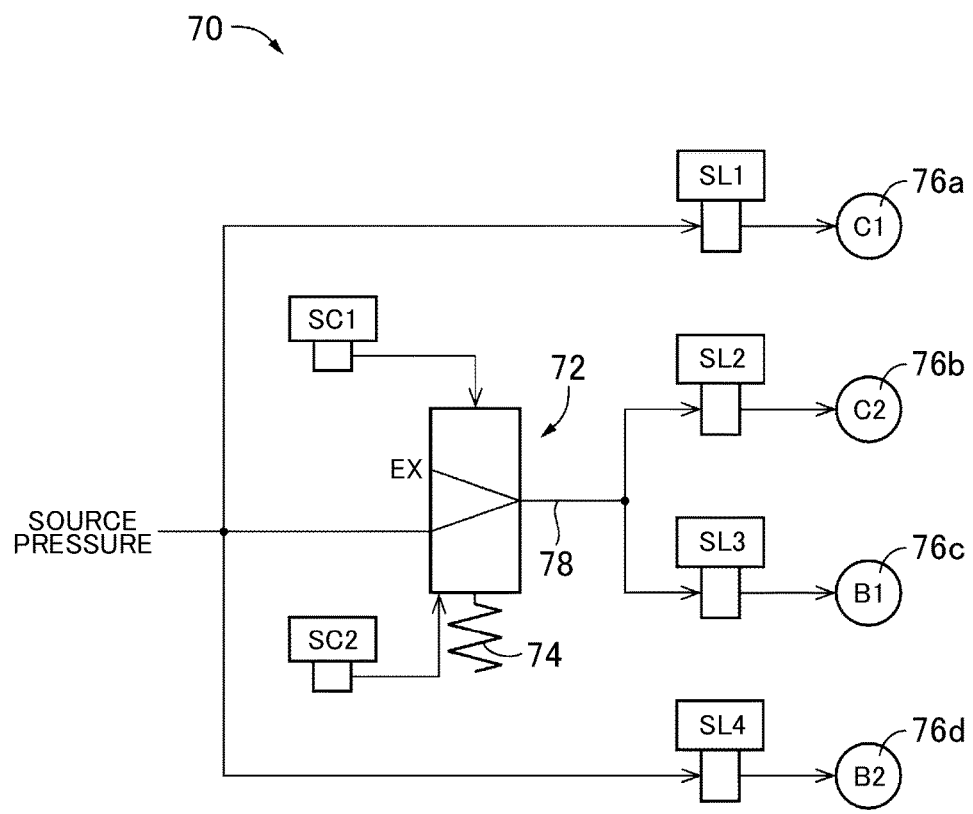
FIG. 4 is a hydraulic circuit diagram that illustrates part of a configuration, associated with shift control over a stepped transmission, in a hydraulic controller provided in the automatic transmission for a vehicle, shown in FIG. 1.

FIG. 4 is a hydraulic circuit diagram that illustrates part of a configuration associated with shift control over the stepped transmission 18 in the hydraulic controller 70 provided in the automatic transmission 10. As shown in FIG. 4, the hydraulic controller 70 includes a first linear solenoid valve SL1, a second linear solenoid valve SL2, a third linear solenoid valve SL3, a fourth linear solenoid valve SL4, a first solenoid valve SC1, a second solenoid valve SC2 and a selector valve 72 as components for controlling the engagement pressures of the clutches C and brakes B that are the engagement elements provided in the stepped transmission 18.

Each of the first linear solenoid valve SL, the second linear solenoid valve SL2, the third linear solenoid valve SL3 and the fourth linear solenoid valve SL4 (hereinafter, simply referred to as linear solenoid valves SL when not specifically distinguished from each other) is a known linear solenoid valve. Each linear solenoid valve SL is an electromagnetic control valve that causes hydraulic pressure commensurate with a command signal to be output in accordance with the electromagnetic force of the solenoid while using, for example, a line pressure that is regulated by a regulator valve (not shown) as a source pressure. The electromagnetic force of the solenoid is controlled on the basis of the command signal that is supplied from the HV-ECU 40.

Hydraulic pressure that is output from the first linear solenoid valve SL1 is supplied to a hydraulic actuator 76a for controlling the engagement state of the first clutch C1. The first linear solenoid valve SL1 controls hydraulic pressure that is supplied to the hydraulic actuator 76a on the basis of the first clutch engagement pressure command PbC1 that is supplied from the HV-ECU 40. Hydraulic pressure that is output from the second linear solenoid valve SL2 is supplied to a hydraulic actuator 76b for controlling the engagement state of the second clutch C2. The second linear solenoid valve SL2 controls hydraulic pressure that is supplied to the hydraulic actuator 76b on the basis of the second clutch engagement pressure command PbC2 that is supplied from the HV-ECU 40. Hydraulic pressure that is output from the third linear solenoid valve SL3 is supplied to a hydraulic actuator 76c for controlling the engagement state of the first brake B1. The third linear solenoid valve SL3 controls hydraulic pressure that is supplied to the hydraulic actuator 76c on the basis of the first brake engagement pressure command PbB1 that is supplied from the HV-ECU 40. Hydraulic pressure that is output from the fourth linear solenoid valve SL4 is supplied to a hydraulic actuator 76d for controlling the engagement state of the second brake B2. The fourth linear solenoid valve SL4 controls hydraulic pressure that is supplied to the hydraulic actuator 76d on the basis of the second brake engagement pressure command PbB2 that is supplied from the HV-ECU 40.

Each of the first solenoid valve SC1 and the second solenoid valve SC2 (hereinafter, simply referred to as solenoid valves SC when not specifically distinguished from each other) is a known on-off valve. Each solenoid valve SC switches between a state (ON) where the selector valve 72 is caused to output hydraulic pressure and a state (OFF) where the selector valve 72 is caused not to output hydraulic pressure on the basis of a command signal that is supplied from the HV-ECU 40. Each solenoid valve SC is suitably a normally-closed on-off valve. Each solenoid valve SC is set to the state where the selector valve 72 is caused to output hydraulic pressure when the solenoid is energized on the basis of the command signal that is supplied from the HV-ECU 40. Each solenoid valve SC is set to the state where the selector valve 72 is caused not to output hydraulic pressure when the solenoid is not energized.

The selector valve 72 is provided in an oil passage 78 on an upstream side, that is, a side close to a source pressure supply source, with respect to the second linear solenoid valve SL2 and the third linear solenoid valve SL3. In other words, the selector valve 72 is provided between the oil passage 78 and the source pressure supply source. The selector valve 72 switches the oil passage in response to its valve element position. That is, in a first valve element position, the oil passage 78 between the source pressure supply source and each of the second linear solenoid valve SL2 and the third linear solenoid valve SL3 is communicated. In a second valve element position, the oil passage 78 between the source pressure supply source and each of the second linear solenoid valve SL2 and the third linear solenoid valve SL3 is cut off, and an oil passage between a drain port and each of the second linear solenoid valve SL2 and the third linear solenoid valve SL3 is communicated. That is, in the present embodiment, the selector valve 72 functions as an oil passage switching device that switches between a state where hydraulic pressure is supplied to the second linear solenoid valve SL2 and the third linear solenoid valve SL3 and a state where supply of hydraulic pressure is cut off.

The selector valve 72 includes a spring 74 that urges the valve element of the selector valve 72 toward the second valve element position. In a state where no hydraulic pressure is supplied from both of the first solenoid valve SC1 and the second solenoid valve SC2, the valve element of the selector valve 72 is set to the second valve element position by the urging force of the spring 74. In a state where hydraulic pressure is supplied from the first solenoid valve SC1 and no hydraulic pressure is supplied from the second solenoid valve SC2, the valve element of the selector valve 72 is set to the first valve element position against the urging force of the spring 74. In a state where hydraulic pressure is supplied from both of the first solenoid valve SC1 and the second solenoid valve SC2, the valve element of the selector valve 72 is set to the second valve element position by the urging force of the spring 74.

That is, in the hydraulic controller 70 shown in FIG. 4, when the first solenoid valve SC1 is set to the ON state and the second solenoid valve SC2 is set to the OFF state, the valve element of the selector valve 72 is set to the first valve element position, with the result that the oil passage 78 between the source pressure supply source and each of the second linear solenoid valve SL2 and the third linear solenoid valve SL3 is communicated. When both of the first solenoid valve SC1 and the second solenoid valve SC2 are set to the OFF state or both of the first solenoid valve SC1 and the second solenoid valve SC2 are set to the ON state, the valve element of the selector valve 72 is set to the second valve element position, the oil passage 78 between the source pressure supply source and each of the second linear solenoid valve SL2 and the third linear solenoid valve SL3 is cut off, and the oil passage between the drain port and each of the second linear solenoid valve SL2 and the third linear solenoid valve SL3 is communicated.

As shown in FIG. 1, in the automatic transmission 10, each of the power split mechanism 16 and the stepped transmission 18 is able to establish all of neutral, forward and reverse. The neutral corresponds to a state where transmission of power is cut off. The forward corresponds to a forward drive mode. The reverse corresponds to a reverse drive mode. That is, when the second electric motor MG2 is caused not to output any power (caused to rotate at idle), the power split mechanism 16 is set to the neutral mode where transmission of power is cut off. When torque in the vehicle forward direction is output from the second electric motor MG2, the power split mechanism 16 is set to the forward drive mode where driving force for moving forward is transmitted to the transmission member 26. When torque in the vehicle reverse direction is output from the second electric motor MG2, the power split mechanism 16 is set to the reverse drive mode where driving force for moving backward is transmitted to the transmission member 26. When both the first clutch C1 and the second clutch C2 are released, the stepped transmission 18 is set to the neutral mode where transmission of power is cut off. As will be described later with reference to FIG. 5, the forward drive mode or reverse drive mode in which driving force that is input from the transmission member 26 is transmitted to the wheels 14 side as driving force for moving forward or driving force for moving backward is set in response to a combination of the engaged or released states of the clutches C and brakes B.

FIG. 5 is an operation chart that shows both a combination of operations of the clutches C and brakes B that are used to establish each gear position and a combination of solenoid patterns of the linear solenoid valves SL and solenoid valves SC in each gear position in the stepped transmission 18. In FIG. 5, the engaged state is indicated by circle and the released state is indicated by blank for the engagement state of each of the clutches C, brakes B and one-way clutch F1 (the same applies to FIG. 10 (described later)). The state where hydraulic pressure is output (the valve is set to the ON state) is indicated by circle and the state where hydraulic pressure is not output (the valve is set to the OFF state) is indicated by blank for the solenoid pattern of each of the linear solenoid valves SL and solenoid valves SC.

As shown in FIG. 5, in the stepped transmission 18, a first gear position (1st) having a maximum speed ratio γ1, for example, about 3.20, is established by engaging the first clutch C1 and the second brake B2 in D range corresponding to a forward range. At the time of a downshift from a second gear position to the first gear position, the relative rotation of the carrier CA1 and ring gear R2 with respect to the case 20 is blocked by the one-way clutch F1, so the second brake B2 does not need to be engaged. The second gear position (2nd) having a smaller speed ratio γ2, for example, about 1.72, than the first gear position is established by engaging the first clutch C1 and the first brake B1. A third gear position (3rd) having a smaller speed ratio γ3, for example, about 1.00, than the second gear position is established by engaging the first clutch C1 and the second clutch C2. A fourth gear position (4th) having a smaller speed ratio γ4, for example, about 0.67, than the third gear position is established by engaging the second clutch C2 and the first brake B1.

As shown in FIG. 5, in the stepped transmission 18, a reverse gear position (reverse speed position) having a speed ratio γR, for example, about 3.20, is established by engaging the first clutch C1 and the second brake B2 in R range corresponding to a reverse range. That is, in the R range, the same gear position as the first gear position in the D range is established by engaging or releasing the same combination of the clutches C and the brakes B in the stepped transmission 18 as that of the first gear position in the D range. When torque in the rotation direction corresponding to the vehicle reverse direction is generated from the second electric motor MG2 in a state where the gear position is established in the stepped transmission 18, the vehicle on which the automatic transmission 10 is mounted is caused to move backward.

As shown in FIG. 5, in the stepped transmission 18, a gear position having the speed ratio γ, for example, about 3.20, is established by engaging the first clutch C1 and the second brake B2 in P range corresponding to a parking range. That is, in the P range, the same gear position as the first gear position in the D range is established by engaging or releasing the same combination of the clutches C and the brakes B in the stepped transmission 18 as that of the first gear position in the D range.

As shown in FIG. 5, in the stepped transmission 18, a gear position having the speed ratio γ, for example, about 3.20, is established by engaging the first clutch C1 and the second brake B2 in N range corresponding to a neutral range. That is, in the N range, the same gear position as the first gear position in the D range is established by engaging or releasing the same combination of the clutches C and the brakes B in the stepped transmission 18 as that of the first gear position in the D range. When the second electric motor MG2 is placed in a no output state in a state where the gear position is established in the stepped transmission 18, the neutral mode in which transmission of power in the automatic transmission 10 is cut off is set.

As shown in FIG. 5, when the first linear solenoid valve SL1 and the fourth linear solenoid valve SL4 are caused to output hydraulic pressure (the valves are set to the on state) and the second linear solenoid valve SL2 and the third linear solenoid valve SL3 are caused not to supply hydraulic pressure (the valves are set to the off state) in the hydraulic controller 70, the first gear position is established in the stepped transmission 18. When the first linear solenoid valve SL1 and the third linear solenoid valve SL3 are caused to output hydraulic pressure and the second linear solenoid valve SL2 and the fourth linear solenoid valve SL4 are caused not to supply hydraulic pressure, the second gear position is established in the stepped transmission 18. When the first linear solenoid valve SL1 and the second linear solenoid valve SL2 are caused to output hydraulic pressure and the third linear solenoid valve SL3 and the fourth linear solenoid valve SL4 are caused not to supply hydraulic pressure, the third gear position is established in the stepped transmission 18. When the second linear solenoid valve SL2 and the third linear solenoid valve SL3 are caused to output hydraulic pressure and the first linear solenoid valve SL1 and the fourth linear solenoid valve SL4 are caused not to supply hydraulic pressure, the fourth gear position is established in the stepped transmission 18.

In the thus configured automatic transmission 10 according to the present embodiment, the differential unit 24 that functions as the continuously variable transmission mechanism and the stepped transmission 18 that is coupled to the differential unit 24 constitute the continuously variable transmission as a whole. A state equivalent to a stepped transmission mechanism is allowed to be achieved by using the differential unit 24 and the stepped transmission 18 by controlling the differential unit 24 such that the speed ratio of the differential unit 24 is constant. Specifically, the differential unit 24 functions as the continuously variable transmission mechanism and the stepped transmission 18 connected in series with the differential unit 24 functions as the stepped transmission mechanism. Thus, for at least one speed position M of the stepped transmission 18, the rotation speed that is input to the stepped transmission 18 (hereinafter, the input rotation speed of the stepped transmission 18), that is, the rotation speed of the transmission member 26 (hereinafter, the transmission member rotation speed N26), is steplessly changed, and a stepless speed ratio is obtained in the speed position M. Therefore, a total speed ratio γT (=Rotation speed NIN of the input shaft 22/Rotation speed NOUT of the output shaft 34) of the automatic transmission 10 is steplessly obtained, so the continuously variable transmission is provided in the automatic transmission 10. The total speed ratio γT of the automatic transmission 10 is the total speed ratio γT of the automatic transmission 10 as a whole on the basis of the speed ratio γ0 of the differential unit 24 and the speed ratio γ of the stepped transmission 18.

For example, with the operation of the differential unit 24 as the continuously variable transmission mechanism, the rotation speed N26 of the transmission member 26 is steplessly changed and a stepless speed ratio range is obtained for each of the first gear position to fourth gear position and reverse gear position of the stepped transmission 18, shown in the engagement operation chart shown in FIG. 5. Therefore, a steplessly continuously variable speed ratio is provided between the adjacent gear positions, and the total speed ratio γT of the automatic transmission 10 as a whole is steplessly obtained. When the speed ratio of the differential unit 24 is controlled so as to be constant and any one of the first gear position to the fourth gear position or the reverse gear position (reverse speed position) is selectively established by selectively engaging the clutches C and the brakes B, the total speed ratio γT of the automatic transmission 10, which changes in substantially geometric progression, is obtained for each gear position. Therefore, the state equivalent to the stepped transmission mechanism is provided in the automatic transmission 10. For example, when the speed ratio γ0 of the differential unit 24 is controlled so as to be fixed to 1, the total speed ratio γT of the automatic transmission 10, which corresponds to each of the first gear position to fourth gear position and reverse gear position of the stepped transmission 18, is obtained for each gear position as shown by the engagement operation chart in FIG. 5. When the speed ratio γ0 of the differential unit 24 is controlled so as to be fixed to a value, for example, about 0.7, smaller than 1 in the third gear position of the stepped transmission 18, the total speed ratio γT that is, for example, about 0.7, smaller than that of the third gear position is obtained.

Figure 6:
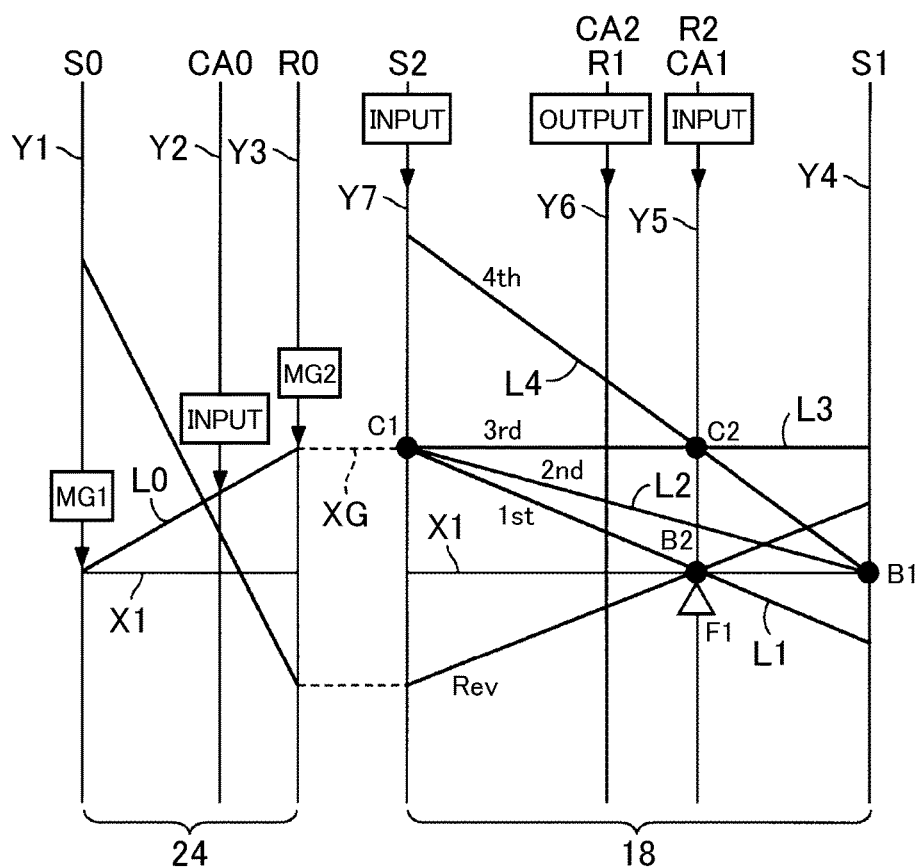
FIG. 6 is a nomograph that shows the relative relationship on straight lines among rotation speeds of rotating elements of which coupled states vary among the gear positions in the automatic transmission for a vehicle, shown in FIG. 1.

FIG. 6 is a nomograph that shows the relative relationship on straight lines among the rotation speeds of the rotating elements of which coupled states vary among the gear positions in the automatic transmission 10 including the differential unit 24 and the stepped transmission 18. The nomograph of FIG. 6 is a two-dimensional coordinate system consisting of the abscissa axis representing the relationship in the gear ratio ρ among the power split device 32 that serves as the planetary gear set and the planetary gear sets 28, 30 and the ordinate axis representing the relative rotation speed. The horizontal line X1 indicates that the rotation speed is zero. The horizontal line XG indicates the rotation speed N26 of the transmission member 26.

The three vertical lines Y1, Y2, Y3 corresponding to the three elements of the power split device 32 that constitutes the differential unit 24 respectively indicate the relative rotation speed of the sun gear S0 corresponding to a first rotating element, the relative rotation speed of the carrier CA0 corresponding to a second rotating element and the relative rotation speed of the ring gear R0 corresponding to a third rotating element in order from the left side. The intervals between the three vertical lines Y1, Y2, Y3 are determined in response to the gear ratio of the planetary gear set that constitutes the power split device 32. The four vertical lines Y4, Y5, Y6, Y7 for the stepped transmission 18 respectively indicate the relative rotation speed of the sun gear S1, the relative rotation speed of the mutually coupled carrier CA1 and ring gear R2, the relative rotation speed of the mutually coupled ring gear R1 and carrier CA2 and the relative rotation speed of the sun gear S2 in order from the right side. The intervals between those vertical lines Y4 to Y7 each are determined in response to the gear ratios of the planetary gear set 28, 30.

When described with the use of the nomograph of FIG. 6, in the power split device 32 (differential unit 24), the second rotating element (carrier CA0) of the power split device 32 is coupled to the input shaft 22, that is, the engine 12, the first rotating element (sun gear S0) is coupled to the first electric motor MG1 and the third rotating element (ring gear R0) is coupled to the transmission member 26 and the second electric motor MG2. Thus, the automatic transmission 10 according to the present embodiment is configured to transmit (input) the rotation of the input shaft 22 to the stepped transmission 18 via the transmission member 26. At this time, the relationship between the rotation speed of the sun gear S0 and the rotation speed of the ring gear R0 is indicated by the straight line L0.

The differential unit 24 is placed in the differential state where the first rotating element, second rotating element and third rotating element of the power split device 32 are relatively rotatable with respect to one another. When the rotation speed of the ring gear R0, indicated by the intersection of the straight line L0 with the vertical line Y3, is constrained by the vehicle speed V and is substantially constant, as the rotation speed of the carrier CA0, which is indicated by the intersection of the straight line L0 with the vertical line Y2, is increased or decreased by controlling the engine rotation speed NE, the rotation speed of the sun gear S0, that is, the rotation speed of the first electric motor MG1, which is indicated by the intersection of the straight line L0 with the vertical line Y1, is increased or decreased.

When the rotation speed of the sun gear S0 is set to the same rotation speed of the engine rotation speed NE as a result of controlling the rotation speed of the first electric motor MG1 such that the speed ratio γ0 of the differential unit 24 is fixed to 1, the ring gear R0, that is, the transmission member 26, is rotated at the same rotation speed as the engine rotation speed NE. Alternatively, when the rotation speed of the sun gear S0 is set to zero as a result of controlling the rotation speed of the first electric motor MG1 such that the speed ratio γ0 of the differential unit 24 is fixed to, for example, about 0.7, smaller than 1, the transmission member 26 is rotated at the rotation speed higher than the engine rotation speed NE.

In the stepped transmission 18, the sun gear S1 that is a fourth rotating element is selectively coupled to the case 20 via the first brake B1. The mutually coupled carrier CA1 and ring gear R2 that constitute a fifth rotating element are selectively coupled to the transmission member 26 via the second clutch C2, and are selectively coupled to the case 20 via the second brake B2 (one-way clutch F1). The mutually coupled ring gear R1 and carrier CA2 that constitute a sixth rotating element are coupled to the output shaft 34. The sun gear S2 that is a seventh rotating element is selectively coupled to the transmission member 26 via the first clutch C1.

In the stepped transmission 18, as shown in FIG. 6, when the first clutch C1 and the second brake B2 (one-way clutch F1) are engaged, the rotation speed of the output shaft 34 in the first gear position (1st) is indicated by the intersection of the oblique straight line L1 with the vertical line Y6. The straight line L1 passes through the intersection of the vertical line Y7 with the horizontal line XG, and the intersection of the vertical line Y5 with the horizontal line X1. The vertical line Y5 indicates the rotation speed of the fifth rotating element. The vertical line Y6 indicates the rotation speed of the sixth rotating element coupled to the output shaft 34. The vertical line Y7 indicates the rotation speed of the seventh rotating element. The rotation speed of the output shaft 34 in the second gear position (2nd) is indicated by the intersection of the oblique straight line L2 with the vertical line Y6. The straight line L2 is determined as a result of engaging the first clutch C1 and the first brake B1. The vertical line Y6 indicates the rotation speed of the sixth rotating element coupled to the output shaft 34. The rotation speed of the output shaft 34 in the third gear position (3rd) is indicated by the intersection of the horizontal straight line L3 with the vertical line Y6. The straight line L2 is determined as a result of engaging the first clutch C1 and the second clutch C2. The vertical line Y6 indicates the rotation speed of the sixth rotating element coupled to the output shaft 34. The rotation speed of the output shaft 34 in the fourth gear position (4th) is indicated by the intersection of the oblique straight line L4 with the vertical line Y6. The straight line L4 is determined as a result of engaging the second clutch C2 and the first brake B1. The vertical line Y6 indicates the rotation speed of the sixth rotating element coupled to the output shaft 34.

In the thus configured automatic transmission 10, when the gear position higher than or equal to the second gear position, that is, the second gear position, the third gear position or the fourth gear position, is established in the stepped transmission 18, backward movement of the vehicle is disabled. That is, as described with reference to FIG. 2, in the stepped transmission 18, the one-way clutch F1 permits the rotation of the carrier CA1 and ring gear R2 in one direction with respect to the case 20, and blocks the rotation of the carrier CA1 and ring gear R2 in the reverse direction with respect to the case 20. Therefore, when the vehicle moves backward, the rotation of the carrier CA1 and ring gear R2 with respect to the case 20 is blocked by the one-way clutch F1. In the first gear position that assumes that the second brake B2 is engaged, the vehicle is allowed to travel even in the case where the rotation of the carrier CA1 and ring gear R2 with respect to the case 20 is blocked by the one-way clutch F1. However, when the rotation of the carrier CA1 and ring gear R2 with respect to the case 20 is blocked in the gear position higher than or equal to the second gear position, the stepped transmission 18 locks. Therefore, when the gear position higher than or equal to the second gear position is established in the stepped transmission 18, backward movement of the vehicle is disabled. That is, in the present embodiment, the first gear position in the stepped transmission 18 corresponds to a gear position in which the vehicle is allowed to move backward. Each of the second gear position, the third gear position and the fourth gear position in the stepped transmission 18 corresponds to a gear position in which the vehicle is not allowed to move backward.

As is apparent from the above description, in the automatic transmission 10 according to the present embodiment, the first gear position in which the vehicle is allowed to move backward or any one of the second gear position to the fourth gear position in which the vehicle is not allowed to move backward is established in the stepped transmission 18 in the D range that is the forward range. In the R range, the P range and the N range that are non-forward ranges, the first gear position that is the same gear position as the gear position in which the vehicle is allowed to move backward is established in the stepped transmission 18.

As is apparent from the above-described engagement chart of FIG. 5, in the automatic transmission 10 according to the present embodiment, in order to establish any one of the second gear position to the fourth gear position that are the gear positions in which the vehicle is not allowed to move backward in the stepped transmission 18, at least one of the second clutch C2 and the first brake B1 is engaged. That is, in the present embodiment, the second clutch C2 or the first brake B1 or both correspond to engagement elements for establishing the gear position in which the vehicle is not allowed to move backward in the stepped transmission 18. The second linear solenoid valve SL2 and the third linear solenoid valve SL3 correspond to electromagnetic valves that respectively supply hydraulic pressure to the second clutch C2 and the first brake B1 that are the engagement elements for establishing the gear position in which the vehicle is not allowed to move backward in the stepped transmission 18.

Figure 7:
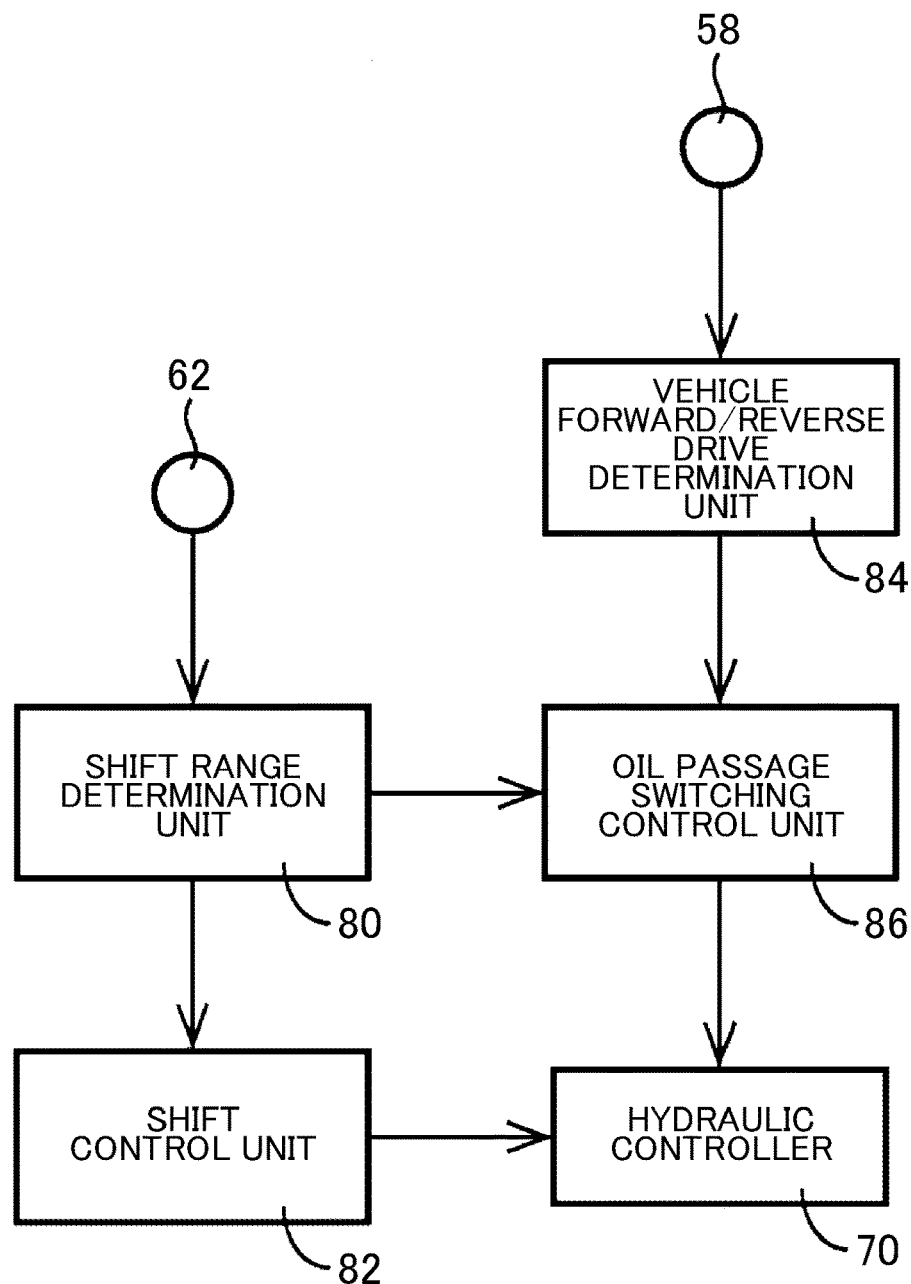
FIG. 7 is a functional block diagram that illustrates a relevant portion of an example of control functions provided in an HV-ECU in the automatic transmission for a vehicle, shown in FIG. 1.

FIG. 7 is a functional block diagram that illustrates a relevant portion of an example of control functions provided in the HV-ECU 40. A shift range determination unit 80, a shift control unit 82, a vehicle forward/reverse drive determination unit 84 and an oil passage switching control unit 86 shown in FIG. 7 are suitably functionally provided in the HV-ECU 40. Instead, these control units may be provided as individual controllers, and implement control described in detail below through communication for information with each other. These control units may be provided in a controller different from the HV-ECU 40.

Figure 8:
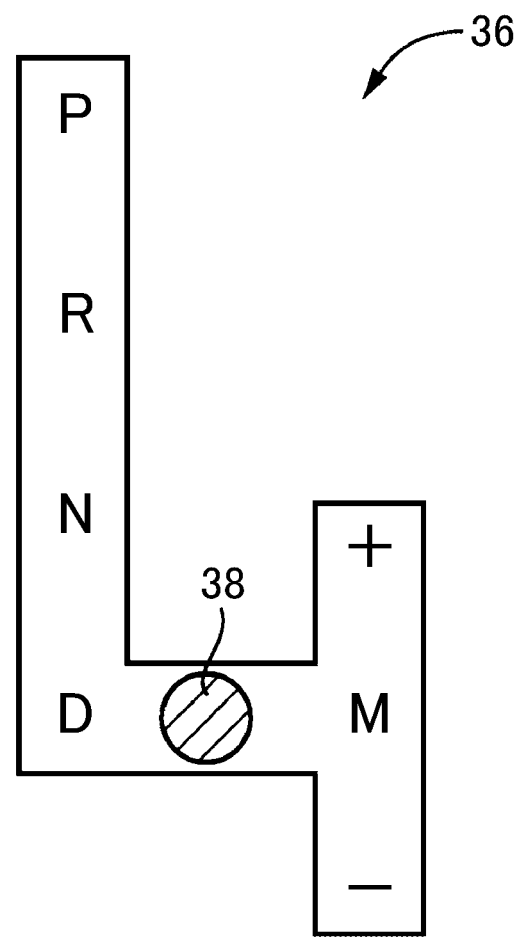
FIG. 8 is a view that shows an example of a shift operating device that is provided in the automatic transmission for a vehicle, shown in FIG. 1, and with which multiple shift positions are manually changed.

FIG. 8 is a view that shows an example of the shift operating device 36 as a change device that is provided in the automatic transmission 10 and with which multiple shift positions PSH are manually changed. The shift operating device 36 is arranged near a driver seat. The shift operating device 36 includes the shift lever 38 that is operated to select from among the multiple shift positions PSH. The shift lever 38 is provided so as to be manually operated to a parking position P (parking), a reverse drive position R (reverse), a neutral position N (neutral), a forward automatic drive position D (drive) or a forward manual drive position M (manual). The parking position is used to set the neutral mode in which the power transmission path in the automatic transmission 10 is cut off and lock the output shaft of the automatic transmission 10 (make the output shaft non-rotatable). The reverse drive position is used to cause the vehicle to move backward. The neutral position is used to set the neutral mode in which the power transmission path in the automatic transmission 10 is cut off. The forward automatic drive position is used to execute automatic transmission control within a variable range of the shiftable total speed ratio γT of the automatic transmission 10, which is obtained by the stepless speed ratio range of the differential unit 24 and each gear position that is established in the stepped transmission 18 by establishing an automatic transmission mode. The forward manual drive position is used to achieve stepped shift of the plurality of speed positions in the automatic transmission 10 by establishing a manual drive mode (manual mode). FIG. 8 illustrates a range-change shift operating device. Instead, the disclosure is also suitably applied to an automatic transmission for a vehicle, including a gear position hold shift operating device.

The shift range determination unit 80 determines the shift range in the automatic transmission 10 in response to driver's operation of the shift operating device 36. Specifically, the shift range determination unit 80 determines the shift range in the automatic transmission 10 on the basis of a signal indicating the shift position PSH corresponding to the operating position of the shift lever 38 in the shift operating device 36. The signal indicating the shift position PSH is detected by the shift position sensor 62. When the signal indicating the P (parking) position has been detected by the shift position sensor 62, it is determined that the P range should be established in the automatic transmission 10. When the signal indicating the R (reverse) position has been detected by the shift position sensor 62, it is determined that the R range should be established in the automatic transmission 10. When the signal indicating the N (neutral) position has been detected by the shift position sensor 62, it is determined that the N range should be established in the automatic transmission 10. When the signal indicating the D (drive) position has been detected by the shift position sensor 62, it is determined that the D range should be established in the automatic transmission 10.

Figure 9:
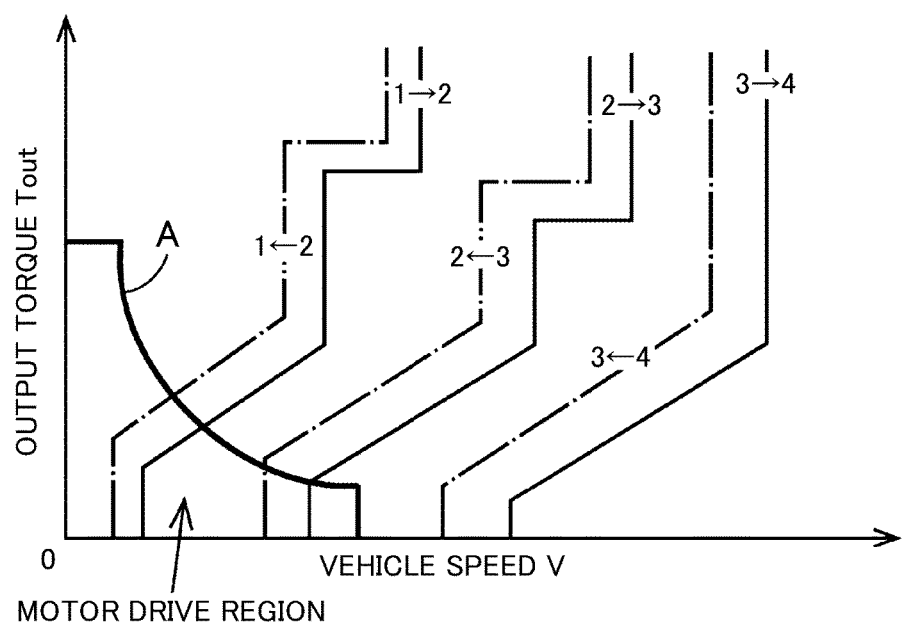
FIG. 9 is a view that illustrates both a shift map for executing shift control over the stepped transmission provided in the automatic transmission for a vehicle, shown in FIG. 1, and a drive source map for executing control for changing a drive source.

FIG. 9 is a view that illustrates both a shift map for executing shift control over the stepped transmission 18 and a drive source map for executing control for changing the drive source of the automatic transmission 10. In the automatic transmission 10, the shift map and the drive source map determined in advance as shown in FIG. 9 are stored in a storage unit in the HV-ECU 40. In the shift map shown in FIG. 9, shift lines (upshift lines) for determining a shift from a low-speed position (high-speed ratio gear position) to a high-speed position (low-speed ratio gear position), that is, an upshift, are indicated by the continuous lines, and shift lines (downshift lines) for determining a shift from a high-speed position to a low-speed position, that is, a downshift, are indicated by the alternate long and short dashes lines. The shift map shown in FIG. 9 basically corresponds to a constant power shift. The shift map shown in FIG. 9 is determined in advance-such that the rotation speed of the engine 12 takes an optimal fuel consumption value. In the drive source map shown in FIG. 9, a region on a low output torque side and low vehicle speed side with respect to a switching line indicated by the wide line A is set as a motor drive region, and a region on a high output torque side and high vehicle speed side with respect to the switching line is set as an engine drive region. In this motor drive region, the HV-ECU 40 executes the motor drive mode by stopping the engine 12 and, for example, using the second electric motor MG2 exclusively as the drive source for propelling the vehicle. In the engine drive region, the HV-ECU 40 executes the engine drive mode by driving the engine 12 and exclusively using the engine 12 as the drive source for propelling the vehicle or executes the hybrid drive mode by using both the engine 12 and the second electric motor MG2 as the drive sources for propelling the vehicle.

The shift control unit 82 executes stepped shift control over the stepped transmission 18. For example, by consulting the relationship (shift line map, shift map) having upshift lines (continuous lines) and downshift lines (alternate long and short dashes lines) stored in advance with the vehicle speed V and the output torque TOUT of the stepped transmission 18 as variables, the gear position that should be established in the stepped transmission 18 is determined on the basis of an actual vehicle speed V and a required output torque TOUT*. The engagement states of the clutches C and brakes B provided in the stepped transmission 18 are controlled via the hydraulic controller 70 such that the determined gear position is established. In other words, it is determined whether to shift the stepped transmission 18 (change the gear position), and, when it is determined to perform the shift, the shift is performed via the hydraulic controller 70.

The vehicle forward/reverse drive determination unit 84 determines whether the vehicle to which the automatic transmission 10 is applied is moving forward or moving backward. Suitably, the determination is carried out on the basis of the actual vehicle speed V corresponding to the output rotation speed NOUT that is detected by the output rotation speed sensor 58. Specifically, when the actual vehicle speed V corresponding to the output rotation speed NOUT that is detected by the output rotation speed sensor 58 is a positive value (V>0), it is determined that the vehicle to which the automatic transmission 10 is applied is moving forward. When the actual vehicle speed V corresponding to the output rotation speed NOUT is a negative value (V<0), it is determined that the vehicle to which the automatic transmission 10 is applied is moving backward.

The oil passage switching control unit 86 switches between a state where hydraulic pressure is supplied to the second linear solenoid valve SL2 and the third linear solenoid valve SL3 and a state where supply of hydraulic pressure is cut off in the hydraulic controller 70. Specifically, the valve element position in the selector valve 72 is switched by controlling hydraulic pressure that is output from the second solenoid valve SC2 provided in the hydraulic controller 70. As shown in the above-described solenoid patterns in FIG. 5, in the hydraulic controller 70, suitably, the first solenoid valve SC1 is constantly set to a state where hydraulic pressure is output in a driven state of the automatic transmission 10 (for example, a state where the power is on).

The oil passage switching control unit 86 switches the valve element position in the selector valve 72 to the first valve element position by causing hydraulic pressure not to output from the second solenoid valve SC2 (by setting the second solenoid valve SC2 to the off state), thus establishing a state where hydraulic pressure is supplied to the second linear solenoid valve SL2 and the third linear solenoid valve SL3. By causing hydraulic pressure to output from the second solenoid valve SC2 (by setting the second solenoid valve SC2 to the on state), the valve element position in the selector valve 72 is switched to the second valve element position, thus establishing a state where supply of hydraulic pressure to the second linear solenoid valve SL2 and the third linear solenoid valve SL3 is cut off.

The oil passage switching control unit 86 switches between a state where hydraulic pressure is supplied to the second linear solenoid valve SL2 and the third linear solenoid valve SL3 and a state where supply of hydraulic pressure is cut off on the basis of the shift range in the automatic transmission 10 (stepped transmission 18) and the vehicle traveling direction. FIG. 5 also shows a combination of the solenoid patterns of the solenoid valves SC commensurate with the shift range in the automatic transmission 10 and the vehicle traveling direction. As shown in FIG. 5, the solenoid patterns in which the first gear position is established in the stepped transmission 18 include two patterns respectively corresponding to the on and off states of the second solenoid valve SC2. In the parking range, that is, the P range, the oil passage switching control unit 86 suitably switches the valve element position in the selector valve 72 to the second valve element position by causing hydraulic pressure to output from the second solenoid valve SC2 irrespective of the vehicle traveling direction. Thus, in the P range, a state where supply of hydraulic pressure to the second linear solenoid valve SL2 and the third linear solenoid valve SL3 is cut off is established.

In the reverse range, that is, the R range, the oil passage switching control unit 86 suitably switches the valve element position in the selector valve 72 to the second valve element position by causing hydraulic pressure to output from the second solenoid valve SC2 irrespective of the vehicle traveling direction. Thus, in the R range, a state where supply of hydraulic pressure to the second linear solenoid valve SL2 and the third linear solenoid valve SL3 is cut off is established.

Suitably, when the neutral range, that is, the N range, is set and the vehicle is moving forward, the oil passage switching control unit 86 switches the valve element position in the selector valve 72 to the first valve element position by causing hydraulic pressure not to output from the second solenoid valve SC2. Thus, when the vehicle is moving forward in the N range, a state where hydraulic pressure is supplied to the second linear solenoid valve SL2 and the third linear solenoid valve SL3 is established.

When the neutral range, that is, the N range, is set and the vehicle is moving backward, the oil passage switching control unit 86 suitably switches the valve element position in the selector valve 72 to the second valve element position by causing hydraulic pressure to output from the second solenoid valve SC2. Thus, when the vehicle is moving backward in the N range, a state where supply of hydraulic pressure to the second linear solenoid valve SL2 and the third linear solenoid valve SL3 is cut off is established.

When the forward range, that is, the D range, is set and the vehicle is moving forward, the oil passage switching control unit 86 suitably switches the valve element position in the selector valve 72 to the first valve element position by causing hydraulic pressure not to output from the second solenoid valve SC2. Thus, when the vehicle is moving forward in the D range, a state where hydraulic pressure is supplied to the second linear solenoid valve SL2 and the third linear solenoid valve SL3 is established.

When the forward range, that is, the D range, is set and the vehicle is moving backward, the oil passage switching control unit 86 suitably switches the valve element in the selector valve 72 to the second valve element position by causing hydraulic pressure to output from the second solenoid valve SC2. Thus, when the vehicle is moving backward in the D range, a state where supply of hydraulic pressure to the second linear solenoid valve SL2 and the third linear solenoid valve SL3 is cut off is established.

As described above, when the R range or P range that is the non-forward range is set or when the vehicle to which the automatic transmission 10 is applied is moving backward, the oil passage switching control unit 86 switches the valve element position in the selector valve 72 to the second valve element position by causing hydraulic pressure to output from the second solenoid valve SC2. Thus, when the non-forward range is set or when the vehicle is moving backward, a state where supply of hydraulic pressure to the second linear solenoid valve SL2 and the third linear solenoid valve SL3 is cut off is established.

FIG. 10 is a chart that conceptually shows that neutral, forward or reverse of the overall automatic transmission 10 is established in response to the state of the power split mechanism 16 that serves as the first transmission and the state of the stepped transmission 18 that serves as the second transmission in the automatic transmission 10 according to present embodiment. As shown in FIG. 10, in the automatic transmission 10, in the P range, the neutral is achieved by causing torque not to output from the second electric motor MG2 in a state where the first gear position (1st) is established in the stepped transmission 18, and the rotation of the output shaft 34 is blocked. In the R range, the reverse drive is achieved by rotating the second electric motor MG2 in the reverse rotation, that is, the direction corresponding to backward movement of the vehicle, in a state where the first gear position is established in the stepped transmission 18. In the N range, the neutral is achieved by causing torque not to output from the second electric motor MG2 in a state where the first gear position is established in the stepped transmission 18. In the D range, the forward drive is achieved by rotating the second electric motor MG2 in the forward rotation direction, that is, the direction corresponding to forward movement of the vehicle in a state where the first gear position is established in the stepped transmission 18. In this way, in the automatic transmission 10, the stepped transmission 18 establishes the same (common) gear position, that is, the first gear position, among the multiple ranges, so shock at the time of a garage shift is reduced, and the response is improved. In the present embodiment, the mode in which the same gear position as the first gear position in the D range is established in each of the P range, the R range and the N range that are the non-forward ranges is illustrated; however, as long as the same gear position as the first gear position in the D range is established in at least one of the P range, the R range and the N range, the advantageous effects of the disclosure are obtained to some extent.

Figure 11:
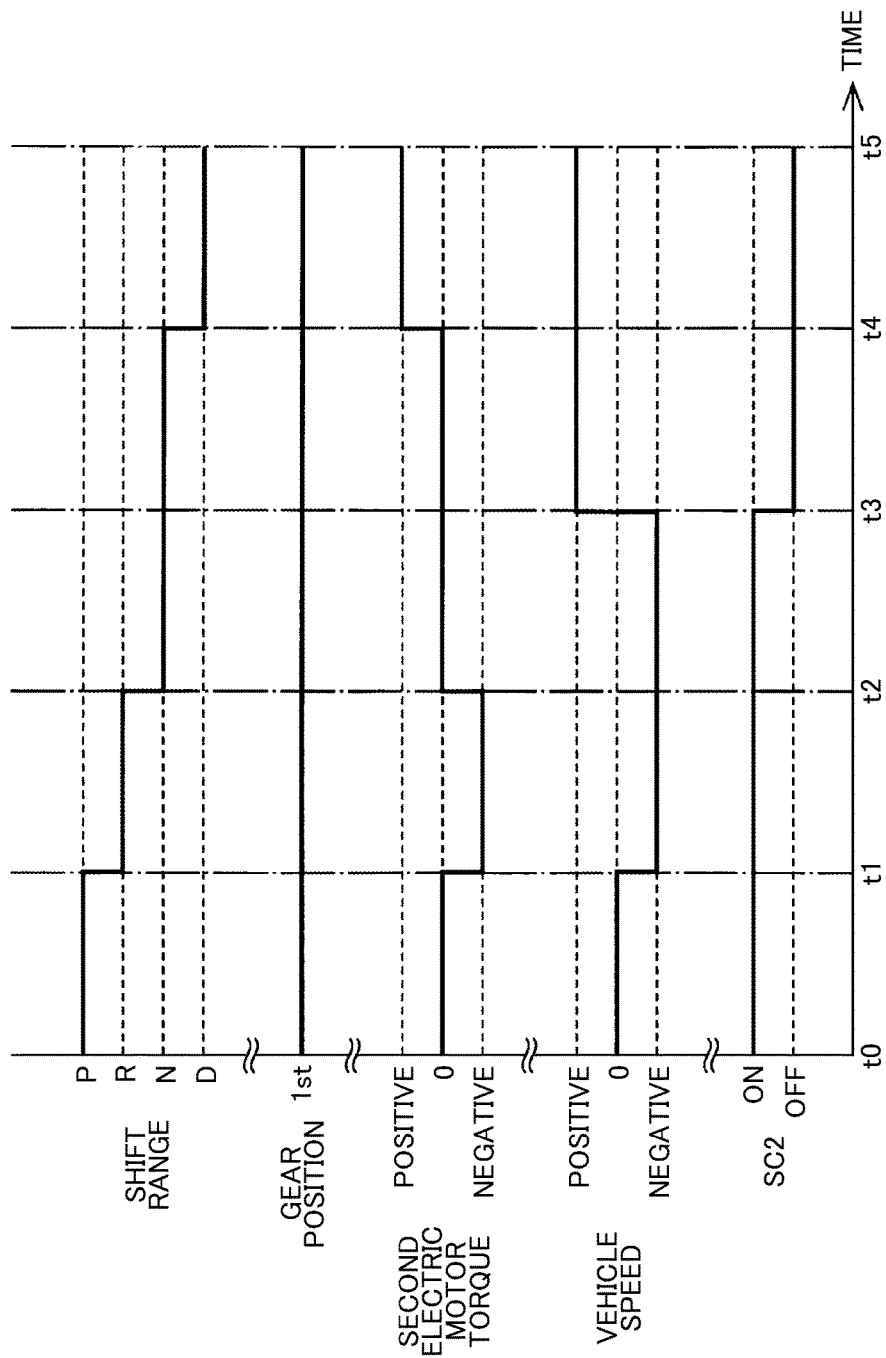
FIG. 11 is a time chart that shows an example of temporal changes in gear position that is established in the stepped transmission, torque of a second electric motor, vehicle speed and output of a second solenoid valve in the case where a shift range is changed in the automatic transmission for a vehicle, shown in FIG. 1.

FIG. 11 is a time chart that shows an example of temporal changes in gear position that is established in the stepped transmission 18, torque of the second electric motor MG2, vehicle speed and output of the second solenoid valve SC2 in the case where the shift range is changed in the automatic transmission 10. In control shown in FIG. 11, the shift range is set to the P range during the period from time t0 to time t1. During the period from time t0 to time t1, the first gear position is established in the stepped transmission 18. The output torque of the second electric motor MG2 is set to zero. The vehicle speed, that is, the vehicle speed V, is set to zero. The output of the second solenoid valve SC2 is in the on state, that is, a state where hydraulic pressure is output. Thus, the valve element position in the selector valve 72 is switched to the second valve element position, and supply of hydraulic pressure to the second linear solenoid valve SL2 and the third linear solenoid valve SL3 is cut off.

In control shown in FIG. 11, the shift range is set to the R range during the period from time t1 to time t2. During the period from time t1 to time t2, the first gear position is established in the stepped transmission 18. The output torque of the second electric motor MG2 is set to a negative value. The vehicle speed, that is, the vehicle speed V, is set to a negative value. The output of the second solenoid valve SC2 is set to the on state, that is, the state where hydraulic pressure is output. Thus, the valve element position in the selector valve 72 is switched to the second valve element position, and supply of hydraulic pressure to the second linear solenoid valve SL2 and the third linear solenoid valve SL3 is cut off.

In control shown in FIG. 11, during the period from time t2 to time t3, the shift range is set to the N range, and the vehicle speed, that is, the vehicle speed V, is set to a negative value. During the period from time t2 to time t3, the first gear position is established in the stepped transmission 18. The output torque of the second electric motor MG2 is set to zero. The output of the second solenoid valve SC2 is set to the on state, that is, the state where hydraulic pressure is output. Thus, the valve element position in the selector valve 72 is switched to the second valve element position, and supply of hydraulic pressure to the second linear solenoid valve SL2 and the third linear solenoid valve SL3 is cut off.

In control shown in FIG. 11, during the period from time t3 to time t4, the shift range is set to the N range, and the vehicle speed, that is, the vehicle speed V, is set to a positive value. During the period from time t3 to time t4, the first gear position is established in the stepped transmission 18. The output torque of the second electric motor MG2 is set to zero. The output of the second solenoid valve SC2 is set to the off state, that is, the state where hydraulic pressure is not output. Thus, the valve element position in the selector valve 72 is switched to the first valve element position, and hydraulic pressure is supplied to the second linear solenoid valve SL2 and the third linear solenoid valve SL3.

In control shown in FIG. 11, during the period from time t4 to time t5, the shift range is set to the D range. During the period from time t4 to time t5, the first gear position is established in the stepped transmission 18. The output torque of the second electric motor MG2 is set to a positive value. The vehicle speed, that is, the vehicle speed V, is set to a positive value. The output of the second solenoid valve SC2 is set to the off state, that is, the state where hydraulic pressure is not output. Thus, the valve element position in the selector valve 72 is switched to the first valve element position, and hydraulic pressure is supplied to the second linear solenoid valve SL2 and the third linear solenoid valve SL3.

As described above, in the automatic transmission 10 according to the present embodiment, when the D range is set and the vehicle is moving forward, hydraulic pressure (source pressure) is supplied to the second linear solenoid valve SL2 and the third linear solenoid valve SL3 by setting the valve element position in the selector valve 72 to the first valve element position. In this state, hydraulic pressure is allowed to be output from the second linear solenoid valve SL2 and the third linear solenoid valve SL3 in response to a command from the HV-ECU 40, and, in addition to the first gear position, the gear position higher than or equal to the second gear position is selectively established in the stepped transmission 18. In the automatic transmission 10, when the P range is set, when the R range is set, when the N range is set and the vehicle is moving backward, or when the D range is set and the vehicle is moving backward, supply of hydraulic pressure (source pressure) to the second linear solenoid valve SL2 and the third linear solenoid valve SL3 is cut off by setting the valve element position in the selector valve 72 to the second valve element position. In this state, if there is a stuck-on failure in the second linear solenoid valve SL2 or the third linear solenoid valve SL3, no source pressure is supplied to those second linear solenoid valve SL2 and third linear solenoid valve SL3, so engagement of the second clutch C2 and the first brake B1 is prevented. As a result, it is possible to suitably avoid locking (vehicle lock) of the stepped transmission 18 due to lock of the one-way clutch F1 in the case where the vehicle is moving backward. That is, in the automatic transmission 10, it is possible to suitably prevent or reduce shock while the vehicle is moving backward because the same gear position is established in the stepped transmission 18 among the multiple ranges.

Figure 12:
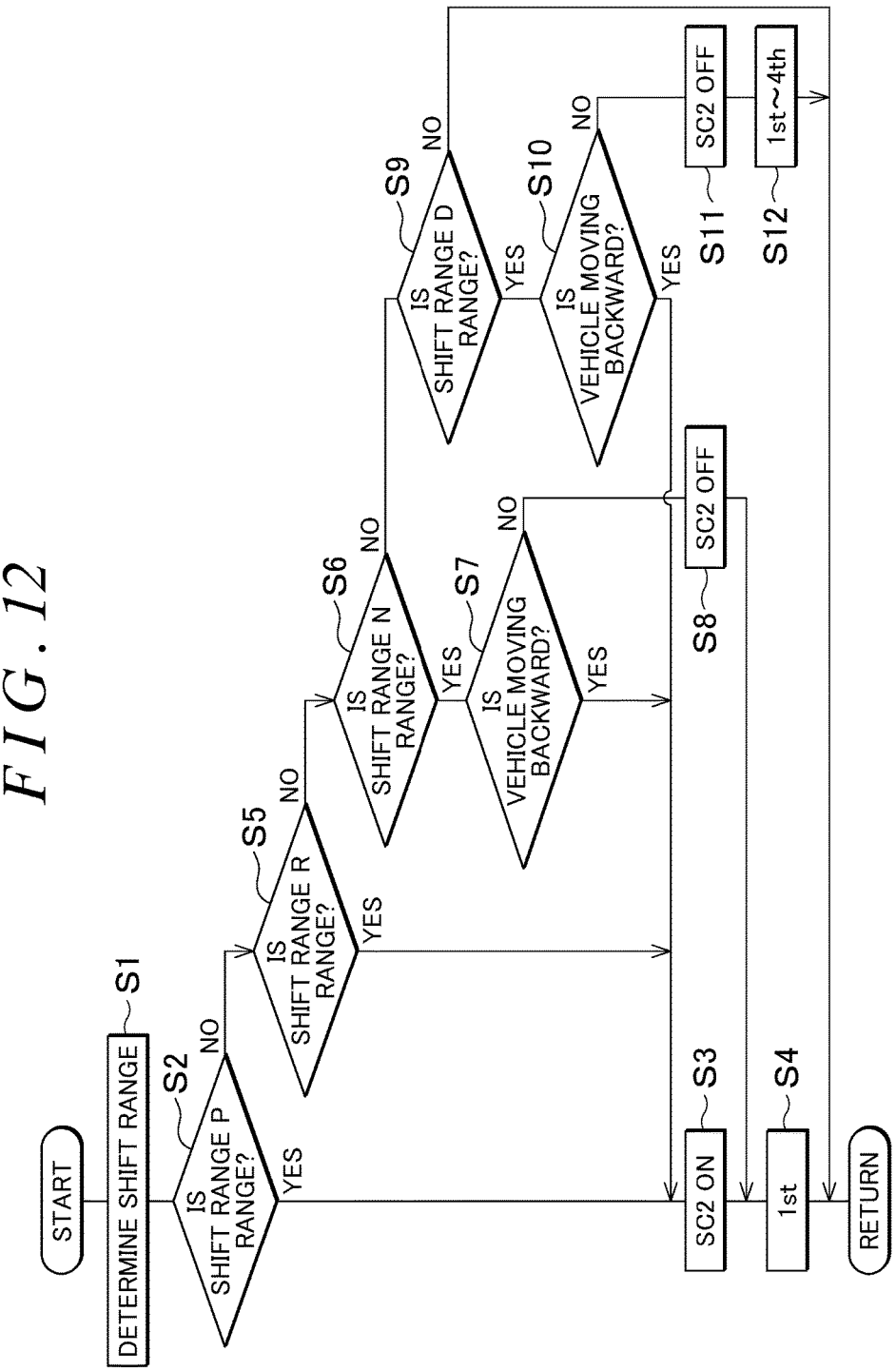
FIG. 12 is a flowchart that illustrates an example of control according to an embodiment, which is executed by the HV-ECU provided in the automatic transmission for a vehicle, shown in FIG. 1.

FIG. 12 is a flowchart that illustrates an example of control according to the present embodiment, which is executed by the HV-ECU 40 and which is repeatedly executed.

Initially, in step (hereinafter, step is omitted) S1, the shift range in the automatic transmission 10 is determined on the basis of a signal that indicates the shift position PSH and that is supplied from the shift position sensor 62. Subsequently, in S2, it is determined whether the shift range determined in S1 is the P range. When negative determination is made in S2, the process from S5 is executed. When affirmative determination is made in S2, the second solenoid valve SC2 is set to the on state, that is, hydraulic pressure is caused to output, in S3. Subsequently, in S4, the first gear position (1st) is established in the stepped transmission 18, after which the routine is ended.

In S5, it is determined whether the shift range determined in S1 is the R range. When affirmative determination is made in S5, the process from S3 is executed. When negative determination is made in S5, it is determined in S6 whether the shift range 26 determined in S1 is the N range. When negative determination is made in S6, the process from S9 is executed. When affirmative determination is made in S6, it is determined in S7 whether the vehicle is backing up (moving backward) on the basis of a signal that indicates the output rotation speed NOUT and that is supplied from the output rotation speed sensor 58. When affirmative determination is made in S7, the process from S3 is executed. When negative determination is made in S7, the second solenoid valve SC2 is set to the off state, that is, hydraulic pressure is caused not to output, in S8, and then the process from S4 is executed.

In S9, it is determined whether the shift range determined in S1 is the D range. When negative determination is made in S9, the routine is ended. When affirmative determination is made in S9, it is determined in S10 whether the vehicle is backing up on the basis of a signal that indicates the output rotation speed NOUT and that is supplied from the output rotation speed sensor 58. When affirmative determination is made in S10, the process from S3 is executed. When negative determination is made in S10, the second solenoid valve SC2 is set to the off state, that is, hydraulic pressure is caused not to output, in S1. Subsequently, in S12, any one of the first gear position (1st) to the fourth gear position (4th) is established in the stepped transmission 18, after which the routine is ended.

In the above-described control, S1, S2, S5, S6 and S9 correspond to the operation of the shift range determination unit 80, S4 and S12 correspond to the operation of the shift control unit 82, S7 and S10 correspond to the operation of the vehicle forward/reverse drive determination unit 84, and S3, S8 and S11 correspond to the operation of the oil passage switching control unit 86.

According to the present embodiment, a gear position in which the vehicle is allowed to move backward or a gear position in which the vehicle is not allowed to move backward is established in the stepped transmission 18 in a forward range, the same gear position as the gear position in which the vehicle is allowed to move backward is established in the stepped transmission 18 in a non-forward range, the hydraulic controller 70 that controls hydraulic pressure that is supplied to the stepped transmission 18 is provided, the hydraulic controller 70 includes the second linear solenoid valve SL2 and the third linear solenoid valve SL3 that are electromagnetic valves that respectively supply hydraulic pressure to the second clutch C2 and the first brake B1 that are engagement elements for establishing the gear position in which the vehicle is not allowed to move backward in the stepped transmission 18, and the selector valve 72 that is an oil passage switching device that is provided in the oil passage 78 upstream of those second linear solenoid valve SL2 and third linear solenoid valve SL3 and that switches between a state where hydraulic pressure is supplied to the oil passage 78 and a state where supply of hydraulic pressure is cut off, and supply of hydraulic pressure to the oil passage 78 is cut off by the selector valve 72 when the non-forward range is set or when the vehicle is moving backward. Thus, when there occurs a failure in the second linear solenoid valve SL2 or the third linear solenoid valve SL3, it is possible to prevent hydraulic pressure from being supplied to the second clutch C2 and the first brake B1, so it is possible to suitably prevent the gear position in which the vehicle is not allowed to move backward from being established. That is, it is possible to provide the automatic transmission 10 that prevents shock in the event of a failure of any one of the electromagnetic valves.

The non-forward range is an R range as a reverse range, and supply of hydraulic pressure to the oil passage 78 is cut off by the selector valve 72 in the R range. Thus, it is possible to suitably prevent the gear position in which the vehicle is not allowed to move backward from being established in the R range, so it is possible to prevent shock in the event of a failure of any one of the electromagnetic valves.

The non-forward range is a P range as a parking range, and supply of hydraulic pressure to the oil passage 78 is cut off by the selector valve 72 in the P range. Thus, by establishing a predetermined gear position in the P range, it is possible to shorten a hydraulic pressure supply time at the time of operation to change from the P range to another range, so it is possible to improve the response at the time of, for example, a garage shift.

When an N range as a neutral range is set and the vehicle is moving backward, supply of hydraulic pressure to the oil passage 78 is cut off by the selector valve 72. Thus, at the time when the vehicle moves backward in the N range, it is possible to suitably prevent the gear position in which the vehicle is not allowed to move backward from being established, so it is possible to prevent shock in the event of a failure of any one of the electromagnetic valves.

When a D range as a forward range is set and the vehicle is moving backward, supply of hydraulic pressure to the oil passage 78 is cut off by the selector valve 72. Thus, at the time when the vehicle moves backward in the D range, it is possible to suitably prevent the gear position in which the vehicle is not allowed to move backward from being established, so it is possible to prevent shock in the event of a failure of any one of electromagnetic valves.

The embodiments of the disclosure are described in detail above with reference to the accompanying drawings; however, the disclosure is not limited to these embodiments. The embodiments may be variously modified without departing from the scope of the disclosure.

What is claimed is:

1. An automatic transmission for a vehicle, the automatic transmission comprising:
a rotating machine;
a stepped transmission, wherein
the rotating machine and the stepped transmission are provided in series with each other in a power transmission path between a drive source and a wheel, and
the stepped transmission comprises a first gear position in which the vehicle is allowed to move backward, and a second gear position in which the vehicle is not allowed to move backward in a forward range,
wherein the same gear position as the first gear position in which the vehicle is allowed to move backward is used in the stepped transmission in a non-forward range; and
a hydraulic controller configured to control hydraulic pressure that is supplied to the stepped transmission, wherein the hydraulic controller comprises an electromagnetic valve and an oil passage switching device, wherein
the electromagnetic valve is configured to supply hydraulic pressure to an engagement element for establishing the second gear position in which the vehicle is not allowed to move backward in the stepped transmission,
the oil passage switching device is provided in an oil passage upstream of the electromagnetic valve, and
the oil passage switching device is configured to:
switch between a state where hydraulic pressure is supplied to the oil passage and a state where supply of hydraulic pressure is cut off,
when the non-forward range is selected or when the vehicle is moving backward, cut off supply of hydraulic pressure to the oil passage, and
when the selected non-forward range is a reverse range, cut off supply of hydraulic pressure to the oil passage.

2. The automatic transmission according to claim 1, wherein
when the selected non-forward range is a parking range, the oil passage switching device is configured to cut off supply of hydraulic pressure to the oil passage.

3. The automatic transmission according to claim 1, wherein
when the selected non-forward range is a neutral range and the vehicle is moving backward, the oil passage switching device is configured to cut off supply of hydraulic pressure to the oil passage.

4. The automatic transmission according to claim 1, wherein
the oil passage switching device is configured to, when the forward range is selected and the vehicle is moving backward, cut off supply of hydraulic pressure to the oil passage.

5. The automatic transmission according to claim 1, wherein
the stepped transmission is a stepped automatic transmission including a plurality of engagement elements and configured to selectively establish any one of a plurality of gear positions in response to a combination of engaged or released states of the engagement elements.

6. The automatic transmission according to claim 1, wherein
the first gear position in which the vehicle is allowed to move backward is a gear position having the largest speed ratio in the stepped transmission.

7. The automatic transmission according to claim 1, wherein
the second gear position in which the vehicle is not allowed to move backward is a gear position having a smaller speed ratio than the first gear position having the largest speed ratio in the stepped transmission.

8. The automatic transmission according to claim 1, wherein
the stepped transmission includes a one-way clutch between a rotating element and a non-rotating member in the stepped transmission, and the one-way clutch permits rotation of the rotating element in one direction with respect to the non-rotating member and blocks rotation of the rotating element in a direction opposite to the one direction.

9. The automatic transmission according to claim 8, wherein
in the first gear position in which the vehicle is allowed to move backward, the one-way clutch is allowed to be engaged.

10. The automatic transmission according to claim 8, wherein
in the second gear position in which the vehicle is not allowed to move backward, the stepped transmission locks when the one-way clutch is engaged.

11. The automatic transmission according to claim 1, wherein
the rotating machine is an electric motor at least including a function of a motor that outputs driving force as a drive source for propelling the vehicle.

12. An automatic transmission for a vehicle, comprising:
a rotating machine;
a stepped transmission, wherein
the rotating machine and the stepped transmission are provided in series with each other in a power transmission path between a drive source and a wheel, and
the stepped transmission comprises a first gear position in which the vehicle is allowed to move backward, and second a gear position in which the vehicle is not allowed to move backward in a forward range,
wherein the same gear position as the first gear position in which the vehicle is allowed to move backward is used in the stepped transmission in a non-forward range; and
a hydraulic controller configured to control hydraulic pressure that is supplied to the stepped transmission, wherein the hydraulic controller comprises an electromagnetic valve and an oil passage switching device, wherein
the electromagnetic valve is configured to supply hydraulic pressure to an engagement element for establishing the second gear position in which the vehicle is not allowed to move backward in the stepped transmission,
the oil passage switching device is provided in an oil passage upstream of the electromagnetic valve, and
the oil passage switching device is configured to:
switch between a state where hydraulic pressure is supplied to the oil passage and a state where supply of hydraulic pressure is cut off,
when the non-forward range is selected or when the vehicle is moving backward, cut off supply of hydraulic pressure to the oil passage, and
when the selected non-forward range is a neutral range and the vehicle is moving backward, cut off supply of hydraulic pressure to the oil passage.

13. The automatic transmission according to claim 12, wherein
when the selected non-forward range is a parking range, the oil passage switching device is configured to cut off supply of hydraulic pressure to the oil passage.

14. The automatic transmission according to claim 12, wherein
the oil passage switching device is configured to, when the forward range is selected and the vehicle is moving backward, cut off supply of hydraulic pressure to the oil passage.

15. The automatic transmission according to claim 12, wherein
the stepped transmission is a stepped automatic transmission comprising a plurality of engagement elements and configured to selectively establish any one of a plurality of gear positions in response to a combination of engaged or released states of the engagement elements.

16. The automatic transmission according to claim 12, wherein
the first gear position in which the vehicle is allowed to move backward is a gear position having the largest speed ratio in the stepped transmission.

17. The automatic transmission according to claim 12, wherein
the second gear position in which the vehicle is not allowed to move backward is a gear position having a smaller speed ratio than the first gear position having the largest speed ratio in the stepped transmission.

18. The automatic transmission according to claim 12, wherein
the stepped transmission comprises a one-way clutch between a rotating element and a non-rotating member in the stepped transmission, and the one-way clutch permits rotation of the rotating element in one direction with respect to the non-rotating member and blocks rotation of the rotating element in a direction opposite to the one direction.

19. The automatic transmission according to claim 18, wherein
in the first gear position in which the vehicle is allowed to move backward, the one-way clutch is allowed to be engaged.

20. The automatic transmission according to claim 18, wherein
in the second gear position in which the vehicle is not allowed to move backward, the stepped transmission locks when the one-way clutch is engaged.

21. The automatic transmission according claim 12, wherein
the rotating machine is an electric motor comprising a function of a motor that outputs driving force as a drive source for propelling the vehicle.

22. An automatic transmission for a vehicle, comprising:
a rotating machine;
a stepped transmission, wherein
the rotating machine and the stepped transmission are provided in series with each other in a power transmission path between a drive source and a wheel, and
the stepped transmission comprises a first gear position in which the vehicle is allowed to move backward, and a second gear position in which the vehicle is not allowed to move backward in a forward range,
wherein the same gear position as the first gear position in which the vehicle is allowed to move backward is used in the stepped transmission in a non-forward range; and
a hydraulic controller configured to control hydraulic pressure that is supplied to the stepped transmission,
wherein the hydraulic controller comprises an electromagnetic valve and an oil passage switching device, wherein
the electromagnetic valve is configured to supply hydraulic pressure to an engagement element for establishing the second gear position in which the vehicle is not allowed to move backward in the stepped transmission,
the oil passage switching device is provided in an oil passage upstream of the electromagnetic valve, and
the oil passage switching device is configured to:
switch between a state where hydraulic pressure is supplied to the oil passage and a state where supply of hydraulic pressure is cut off,
when the non-forward range is selected or when the vehicle is moving backward, cut off supply of hydraulic pressure to the oil passage, and
when the forward range is selected and the vehicle is moving backward, cut off supply of hydraulic pressure to the oil passage.

23. The automatic transmission according to claim 22, wherein
when the selected non-forward range is a parking range, the oil passage switching device is configured to cut off supply of hydraulic pressure to the oil passage.

24. The automatic transmission according to claim 22, wherein
the stepped transmission is a stepped automatic transmission that comprises a plurality of engagement elements and is configured to selectively establish any one of a plurality of gear positions in response to a combination of engaged or released states of the engagement elements.

25. The automatic transmission according to claim 22, wherein
The first gear position in which the vehicle is allowed to move backward is a gear position having the largest speed ratio in the stepped transmission.

26. The automatic transmission according to claim 22, wherein the second gear position in which the vehicle is not allowed to move backward is a gear position having a smaller speed ratio than the first gear position having the largest speed ratio in the stepped transmission.

27. The automatic transmission according to claim 22, wherein the stepped transmission comprises a one-way clutch between a rotating element and a non-rotating member in the stepped transmission, wherein the one-way clutch permits rotation of the rotating element in one direction with respect to the non-rotating member and blocks rotation of the rotating element in a direction opposite to the one direction.

28. The automatic transmission according to claim 27, wherein in the first gear position in which the vehicle is allowed to move backward, the one-way clutch is allowed to be engaged.

29. The automatic transmission according to claim 27, wherein in the second gear position in which the vehicle is not allowed to move backward, the stepped transmission locks when the one-way clutch is engaged.

30. The automatic transmission according to claim 22, wherein the rotating machine is an electric motor comprising a function of a motor that outputs driving force as a drive source for propelling the vehicle.

* * * * *